(12) United States Patent
Scotton et al.

(10) Patent No.: US 10,435,181 B2
(45) Date of Patent: Oct. 8, 2019

(54) METHOD FOR APPLYING A TREATMENT FLUID TO INTERIOR SURFACES OF AN AIRCRAFT FUSELAGE

(71) Applicant: EMBRAER S.A., São José dos Campos (BR)

(72) Inventors: Rogério Scafutto Scotton, São José dos Campos (BR); Natália Vianna Correia, São José dos Campos (BR); Luiz Fernando Dos Santos, São José dos Campos (BR); Thomas Waring, São José dos Campos (BR); Richard Waring, São José dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 213 days.

(21) Appl. No.: 15/383,267

(22) Filed: Dec. 19, 2016

(65) Prior Publication Data
US 2018/0170579 A1    Jun. 21, 2018

(51) Int. Cl.
*B64F 5/40*    (2017.01)
*B64C 1/14*    (2006.01)
(Continued)

(52) U.S. Cl.
CPC ........... *B64F 5/40* (2017.01); *B05B 12/32* (2018.02); *B05B 13/041* (2013.01); *B05B 13/0431* (2013.01); *B05B 13/06* (2013.01); *B05B 13/069* (2013.01); *B05B 13/0618* (2013.01); *B05B 15/60* (2018.02); *B05D 1/02* (2013.01); *B05D 7/22* (2013.01); *B25J 5/005* (2013.01); *B25J 11/0075* (2013.01); *B64C 1/143* (2013.01); *B64C 1/1407* (2013.01); *B64C 1/1423* (2013.01); *B64C 1/1438* (2013.01); *B64C 1/1461* (2013.01); *B64C 1/18* (2013.01); *B64C 1/22* (2013.01); *B64C 1/34* (2013.01); *Y10S 901/01* (2013.01); *Y10S 901/27* (2013.01)

(58) Field of Classification Search
CPC ....... B64F 5/40; B05B 13/06; B05B 13/0618; B05B 13/069; B05D 1/02; B05D 7/22; Y10S 901/01; Y10S 901/27; B64C 1/00; B64C 1/1407; B64C 1/143; B64C 1/1438; B64C 1/1461; B64C 1/18; B64C 1/22; B64C 1/34
USPC ................. 427/236; 118/306, 317; 244/236; 901/43
See application file for complete search history.

(56) References Cited

U.S. PATENT DOCUMENTS 5,223,459 A * 6/1993 Odawara .............. E04B 1/346
454/236
5,409,561 A * 4/1995 Wood ................. F16L 55/1645
138/97

(Continued)

*Primary Examiner* — William P Fletcher, III
(74) *Attorney, Agent, or Firm* — Nixon & Vanderhye P.C.

(57) ABSTRACT

Methods are provided by which a treatment fluid (e.g., a liquid corrosion inhibitor) may be applied onto the interior surfaces of an aircraft fuselage. The methods include (a) deploying an automated guided vehicle (AGV) comprising a carriage assembly and a robotic spray system carried by the carriage assembly within the interior of the fuselage, (b) closing the cabin door opening of the fuselage with the AGV positioned therewithin, and (c) operating the AGV so as to move within the fuselage along a longitudinal axis thereof to spray the treatment fluid onto the surfaces thereof.

12 Claims, 28 Drawing Sheets

(51) Int. Cl.
  *B05B 15/60*  (2018.01)
  *B05B 13/06*  (2006.01)
  *B05D 7/22*  (2006.01)
  *B64C 1/18*  (2006.01)
  *B64C 1/22*  (2006.01)
  *B64C 1/34*  (2006.01)
  *B05D 1/02*  (2006.01)
  *B05B 13/04*  (2006.01)
  *B05B 12/32*  (2018.01)
  *B25J 5/00*  (2006.01)
  *B25J 11/00*  (2006.01)

(56) References Cited

U.S. PATENT DOCUMENTS

| | | | |
|---|---|---|---|
| 5,913,977 A * | 6/1999 | Nichols | F16L 55/46 |
| | | | 118/254 |
| 6,699,324 B1 * | 3/2004 | Berdin | B05B 13/0636 |
| | | | 118/306 |
| 7,112,350 B1 * | 9/2006 | Roberts | B05B 13/06 |
| | | | 427/236 |
| 8,941,817 B2 * | 1/2015 | Laudrain | B41J 3/407 |
| | | | 356/4.01 |
| 2013/0280424 A1 * | 10/2013 | Jedneak | B05C 7/08 |
| | | | 427/236 |

* cited by examiner

METHOD FOR APPLYING A TREATMENT FLUID TO INTERIOR SURFACES OF AN AIRCRAFT FUSELAGE

FIELD

The embodiments disclosed herein relate generally to automated vehicle manufacturing techniques. In specific embodiments, systems and methods are provided by which a fluid (e.g., a corrosion inhibitor) may be applied onto the interior surfaces of an aircraft fuselage using an automated system that performs numerous fully automated sub-processes with assistance of anthropomorphic robotic arms and an automated guided vehicle (AGV).

BACKGROUND

Due to the confined space of an aircraft fuselage interior, treatment fluids (e.g., an organic corrosion inhibitor compound) have traditionally been applied by a spray gun system manually manipulated by a technician so as to direct a spray of fluid onto the aluminum surfaces of the aircraft fuselage interior. Specifically, during aircraft manufacturing, a technician must physically enter the aircraft fuselage once the fuselage junction has been completed in order to mask, and thereby protect, certain areas of the aircraft interior that cannot be contaminated with the corrosion inhibitor compound. Once the interior fuselage surfaces have been masked, the machine spray guns are then prepared with the corrosion inhibitor compound to be applied. Numerous (typically between ten to twelve) technicians must then enter the interior of the fuselage in order to begin applying the corrosion inhibitor compound. It is important to emphasize that at this stage of the manufacturing process, there is no installed floor and thus the risk to technician safety is very high. In addition, this safety risk progressively gets worse during application of the corrosion inhibitor compound due to the overspray created by the spray guns which in turn blocks the technician's view on the confined space. Furthermore, after one hour of application, the technician must take certain precautionary breaks in order to shower because of the heat that is typically experienced within the fuselage interior during the spraying procedure, especially in the summer time when ambient temperatures can reach approximately 40° C. This lack of visibility within the confined space of the fuselage interior during spray application of the corrosion inhibitor compound may therefore cause the following issues:

(a) Product puddling—Excess corrosion inhibitor compound may accumulate (puddle) due to the excess applied compound flowing or leaking into certain areas.

(b) Inadequate product application—The technician may not be able to visually determine in some areas of the fuselage interior whether the proper amount of corrosion inhibitor compound has been applied due to the lack of visibility and the overspray.

(c) Bare surfaces—Some areas within the fuselage interior are so confined as to prevent access by the spray gun thereby resulting in no corrosion inhibitor compound being applied.

(d) Excess product application—Due to low visibility conditions, the technician may apply more than the specified amount of the corrosion inhibitor compound thereby increasing the coating thickness above normal which in turn increases aircraft weight.

The manual process to apply the organic corrosion inhibitor compound on the interior surfaces of an aircraft fuselage as discussed above needs to follow strictly the requirements of the product. For this reason, there are many issues that arise by the manual application process, such as longer cycle times for each process step that results in low productivity, additional time to rework, increased labor costs, lower quality of the processes and less reliability on the results. These disadvantages are the result of the current craft process for application of the fluid products. The sub-processes demand high man-hours since each skilled technician is responsible for many tasks. Hence, the current manual application processes lack repeatability and standardization while also requiring a very slow learning curve for the technician.

Besides the environmental savings and ergonomic issues, an automated process also improves the quality of product application since the interior fuselage surfaces are more adequately covered. As such, the different automated processes are more reliably repeatable thereby in turn resulting in beneficially reducing aircraft weight.

One prior proposal for identifying surface locations within the interior of an aircraft fuselage by a video camera mounted on a robot end effector of a mobile assembly is disclosed in U.S. Pat. No. 8,941,817 (the entire content of which is expressly incorporated hereinto by reference). The disclosed mobile assembly is capable of moving onto flat surfaces inside the fuselage with the main function of the video camera and its associated system being to identify interior fuselage structures for future bracket installation. No disclosure is apparent whereby the mobile assembly may automatically move into and out of the aircraft fuselage interior or the application of a treatment fluid within the aircraft fuselage interior.

Thus, although individual automated techniques may exist, there still exists a need in this art for a fully automated systems and methods by which the interior of an aircraft fuselage may be coated with an applied treatment fluid (e.g., a corrosion inhibitor compound). It is towards fulfilling such needs that the embodiments disclosed herein are directed.

SUMMARY

In general, the embodiments disclosed herein provide systems and methods by which a treatment fluid (e.g., a liquid corrosion inhibitor) may be applied onto the interior surfaces of an aircraft fuselage. More specifically, the embodiments disclosed herein employ an automated guided vehicle (AGV) comprising a carriage assembly and a robotic spray system carried by the carriage assembly. The AGV may be supported by a support platform positioned laterally of an aircraft fuselage in alignment with the cabin door opening of the fuselage. The AGV may thus be deployable through the cabin door opening to a deployed position within the interior of the fuselage so as to be moveable along a longitudinal axis of the fuselage to allow the robotic spray assembly to spray the treatment fluid onto interior surfaces of the fuselage. A sealing door assembly located rearwardly of the AGV which is moveable relative to a door opening in the fuselage may also be provided so as to sealingly close the door opening of the fuselage when the AGV is deployed within the interior of the fuselage.

According to some embodiments, a support platform may be provided which supports the AGV in a standby position thereon. The support platform may be provided as part of an application booth so as to be positioned laterally adjacent to the cabin door opening of the aircraft fuselage to thereby allow the AGV to be deployed from the standby position on the support platform and into the deployed position thereof within the interior of the fuselage. Such deployment is facilitated by providing the carriage assembly with a set of deployment guide wheels which allow the AGV to be moved between the standby and deployed positions along a deployment direction which is transverse to a longitudinal axis of the fuselage. The carriage assembly may also be provided with carriage drive assemblies aligned with the longitudinal axis of the fuselage so as to move the AGV longitudinally within the fuselage when the AGV is in the deployed position thereof.

The deployment guide wheel assemblies are moveable between an extended position wherein the deployment guide wheel assemblies thereof are engaged with the lateral rail system while the carriage drive assemblies are spaced thereabove to allow movement of the AGV in the deployment direction, and a raised position wherein the carriage drive assemblies are lowered into contact with the interior rail system. The carriage drive assemblies may be spaced apart from one another and comprise a pair of drive wheels, and a drive belt positioned around the drive wheels. A motor drive assembly is carried by the carriage assembly and is connected to at least one of the drive wheels to provide motive force thereto.

For deployment of the AGV, a lateral guide rail system extending from the support platform into the fuselage through the cabin door opening substantially transverse to the longitudinal axis of the fuselage may be provided. An interior rail system positioned at an end of the lateral rail system and extending longitudinally within the interior of the fuselage along the longitudinal axis thereof may also be provided so as to allow movement of the AGV longitudinally within the fuselage during a spraying operation.

The carriage system may be provided in some embodiments with a clamping assembly to positionally clamp the AGV to the interior rail system and thereby provide the robotic spray system with positional accuracy and stability when applying the treatment fluid to the interior surfaces of the fuselage. The clamping system may, for example, be provided with an elongate clamp arm that is moveable between raised and lowered positions relative to the carriage system, and at least one clamp pad positioned at an end of the clamp arm for clamping engagement with the interior rail system.

The sealing door assembly on the lateral support platform may be provided with door rails aligned in the deployment direction of the AGV so as to allow the sealing door assembly to be slideably moved into a position which closes the door opening when the AGV is within the interior of the fuselage. According to some embodiments, an arcuate dummy door is provided as part of the sealing door assembly which is sized and configured to close the cabin door opening. Further sealing of the interior of the fuselage when the AGV is in the interior thereof may be provided by a rubber seal which surrounds a perimetrical edge of the dummy door.

According to some embodiments, a swing arm is provided which includes an upper end hinged to the dummy door and an opposite lower end having a guide roller assembly. An actuator may be operatively connected to the swing arm for pivotally moving the swing arm between a retracted position wherein the guide roller assembly is positioned near a lower end of the dummy door and an extended position wherein the guide roller assembly is spaced outwardly from the lower end of the dummy door. One embodiment of the guide roller assembly includes opposed pairs of guide rollers mounted for rotational movement about respective rotational axes that are mutually orthogonal to one another.

An umbilical hose which provides fluid, electrical and/or compressed air services to the AGV from fuselage-exterior sources thereof may be connected to the AGV and extend through the dummy door and the guide roller assembly of the swing arm. A rotatable drum system comprising a rotatable hose drum around which a supply of umbilical hose is wound is provided to allow the umbilical cord to be paid out during deployment and spraying operation of the AGV within the interior of the fuselage and to withdraw the umbilical hose when the AGV is recovered onto the support platform following the spraying operation. The rotatable drum system may be provided with a cleaning tank system through which the umbilical hose passes to clean an exterior surface of the umbilical hose before being wound around the hose drum during its recovery onto the drum.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 11A:
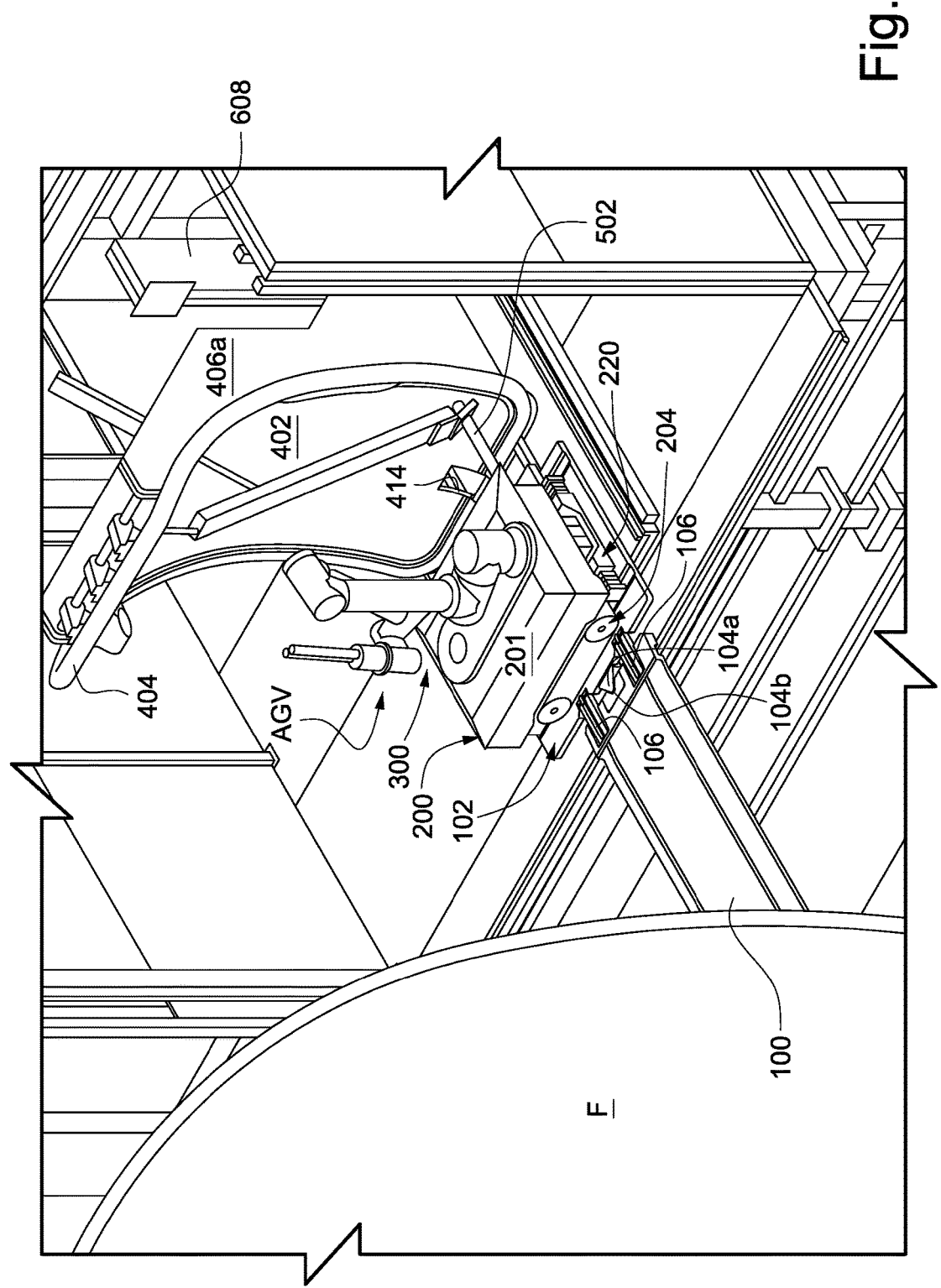
Figure 11B:
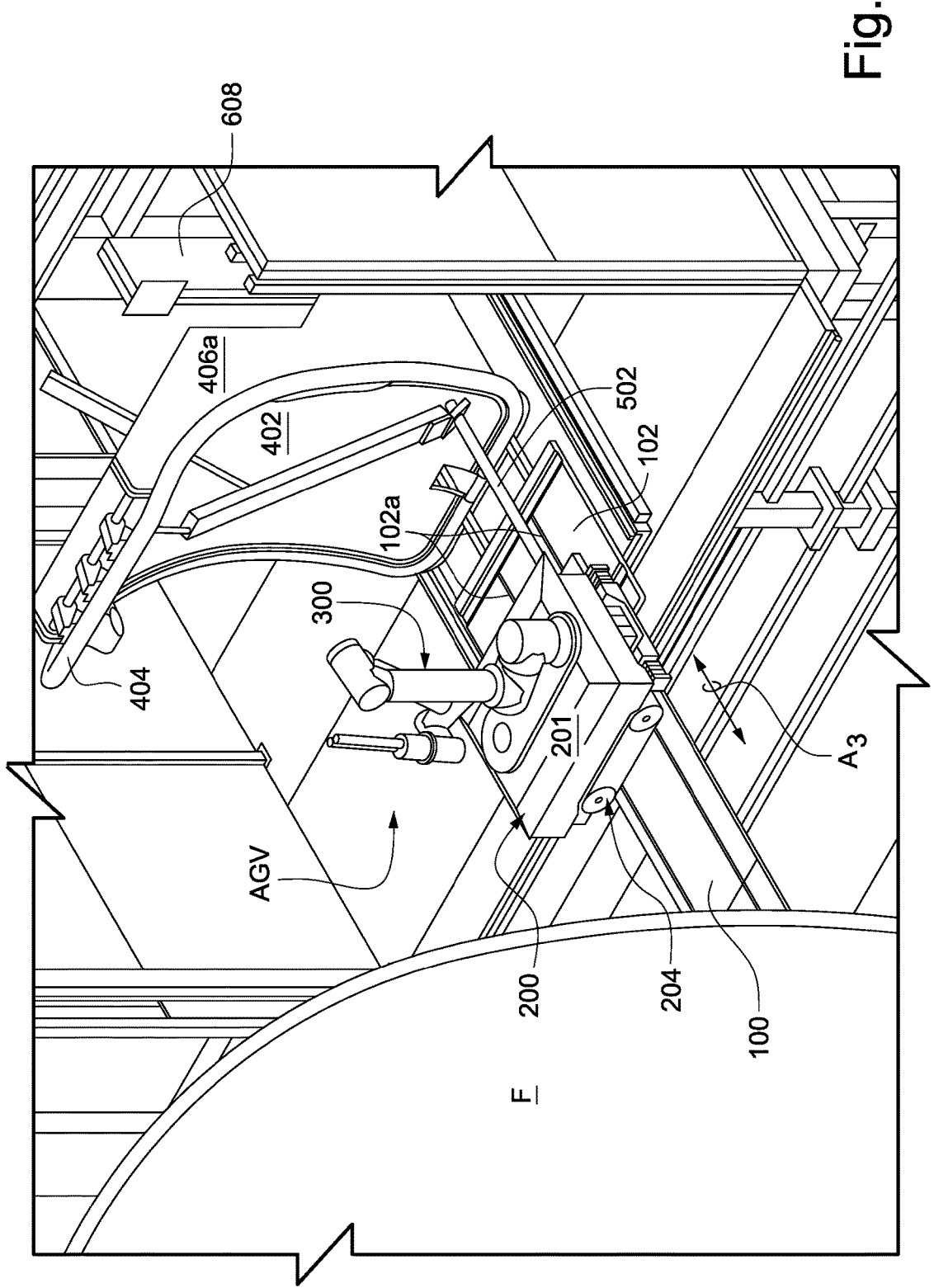
Figure 11C:
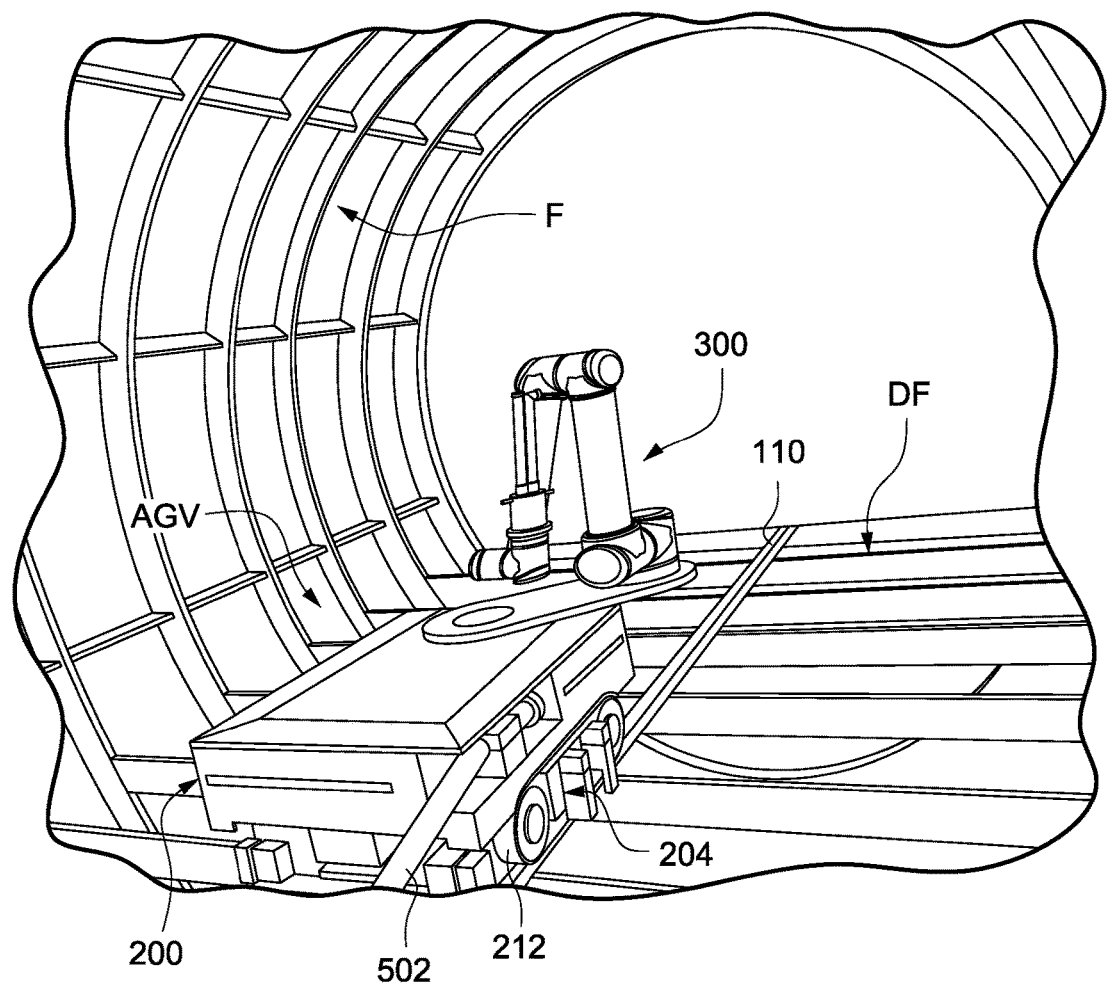
Figure 12A:
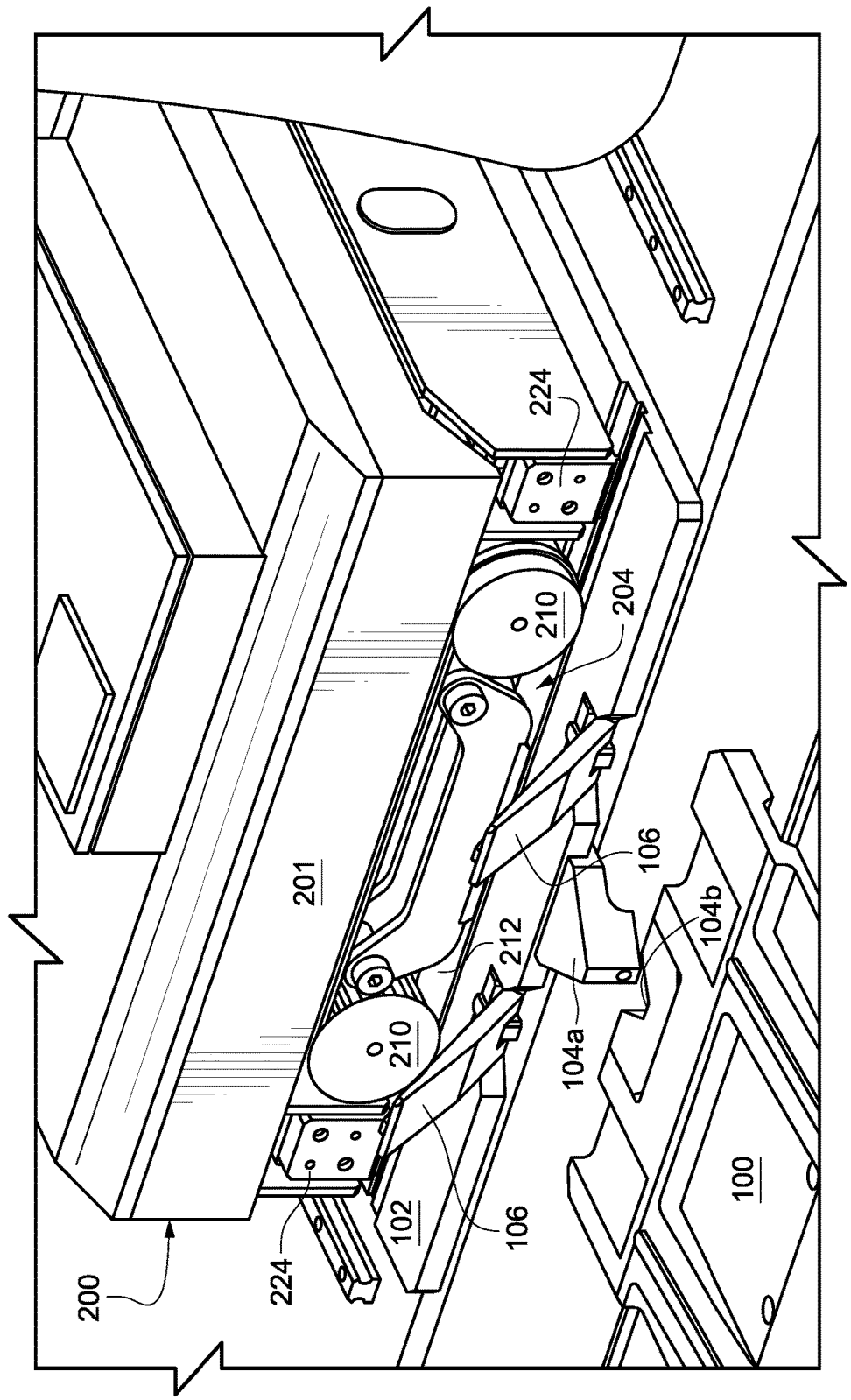
Figure 12B:
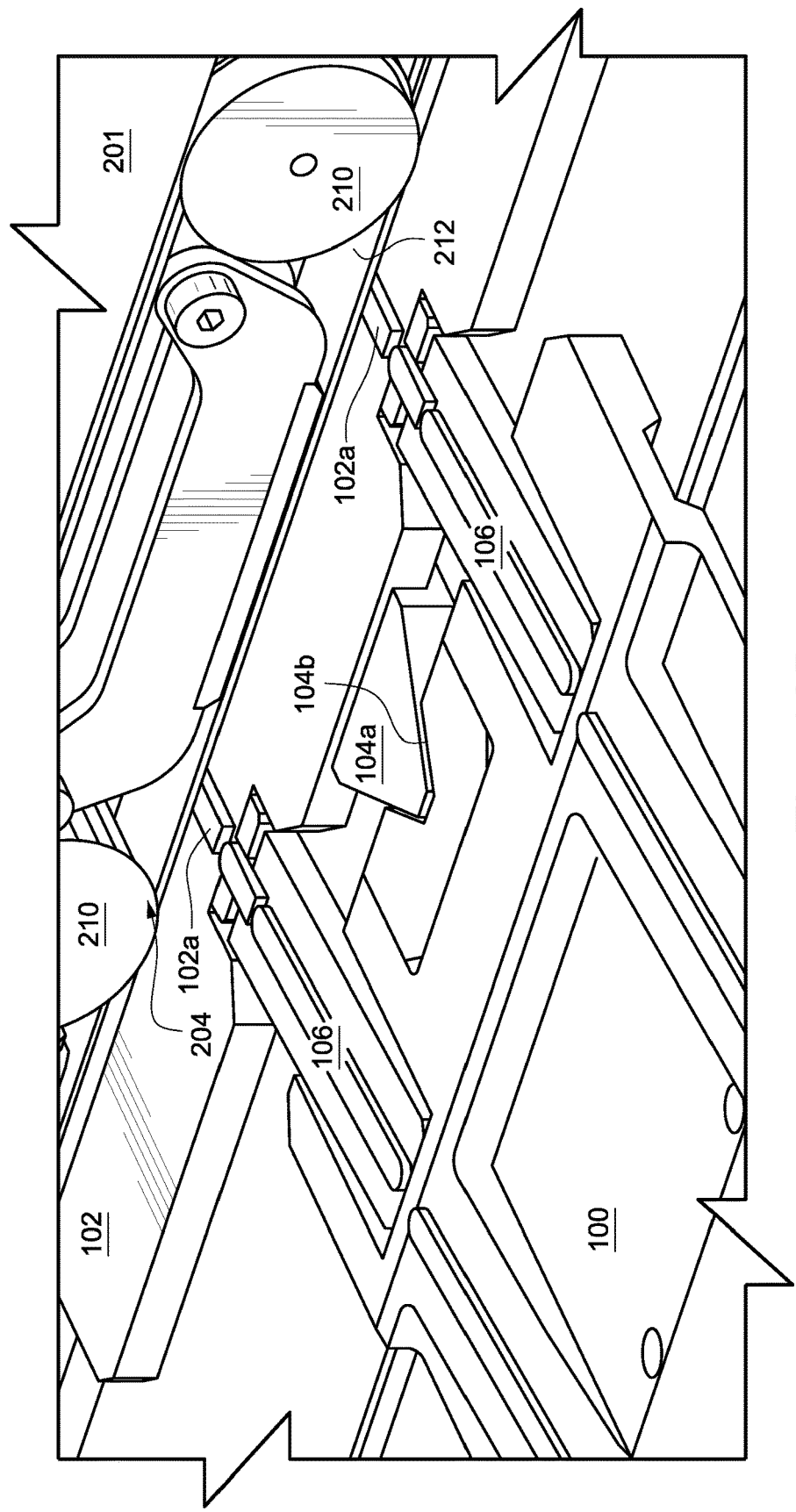
Figure 13:
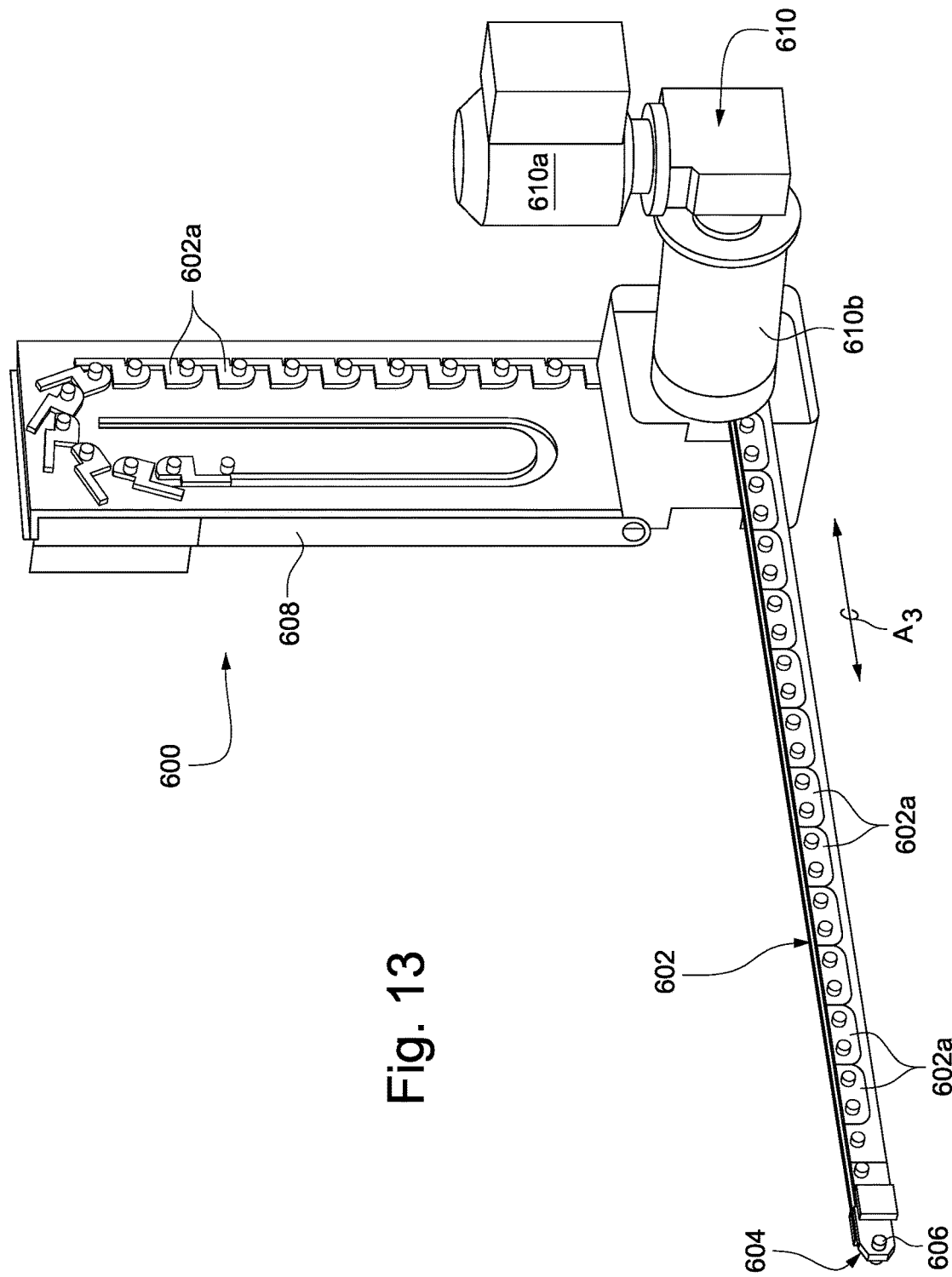
Figure 14A:
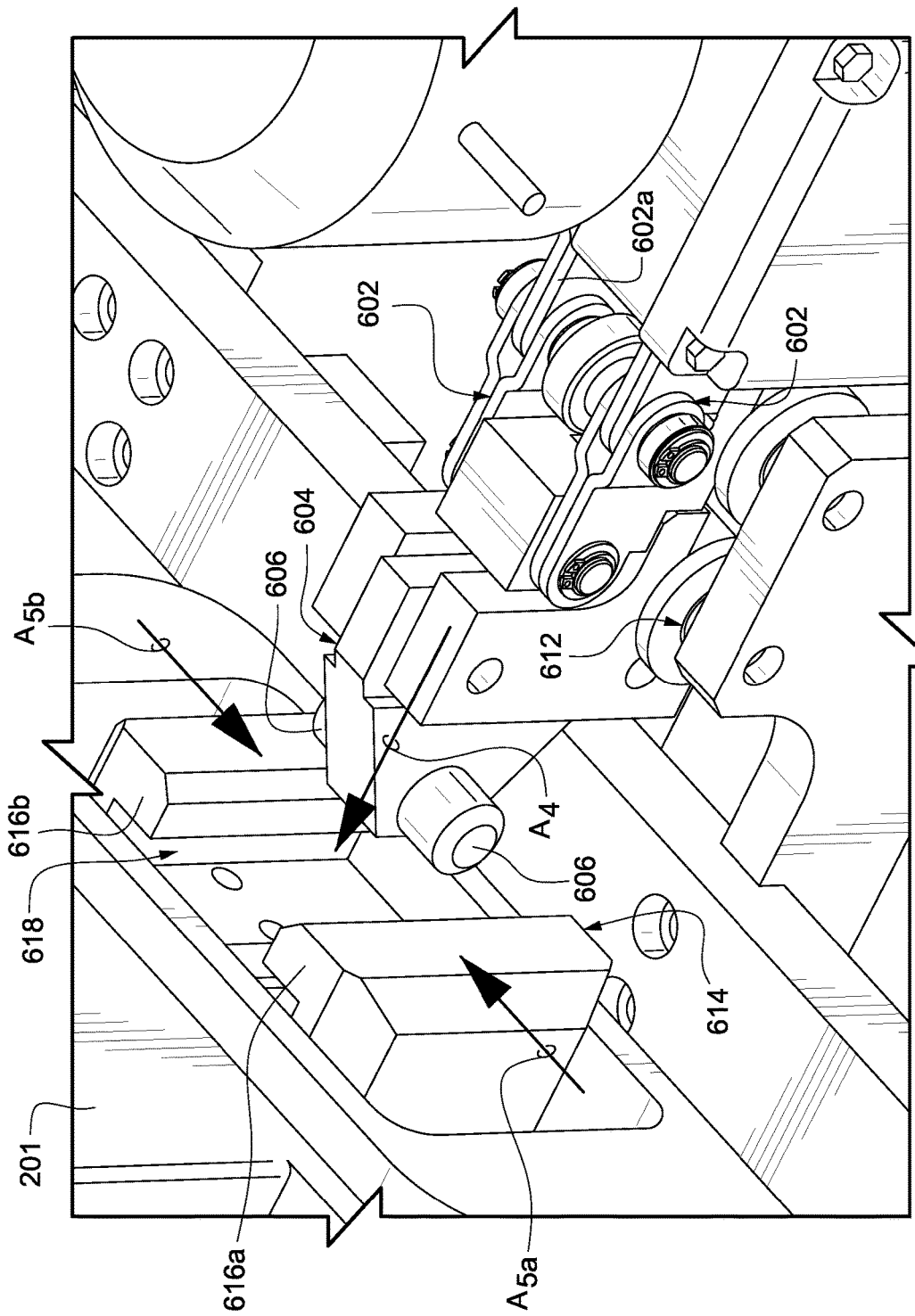
Figure 14B:
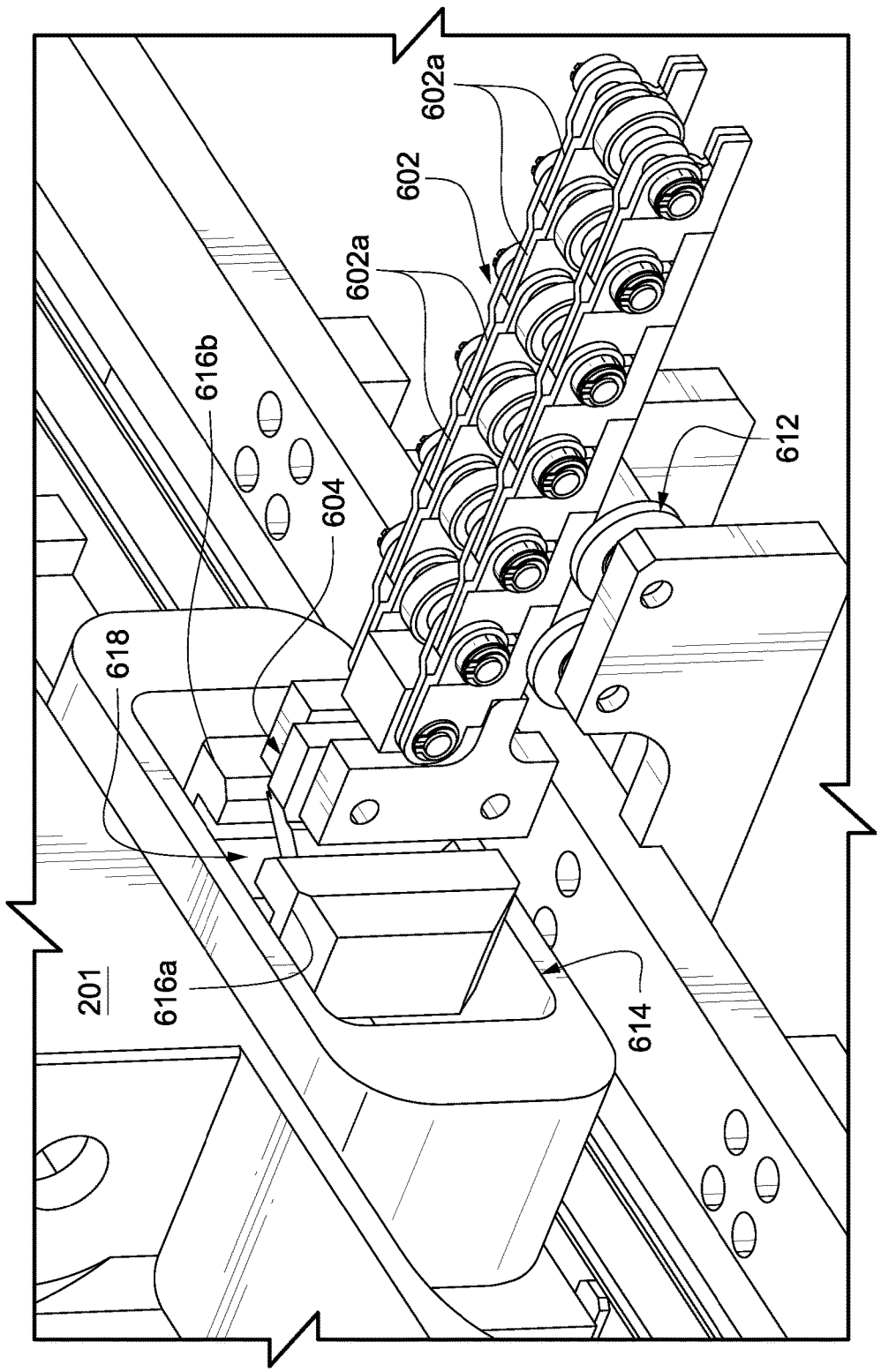
Figure 15:
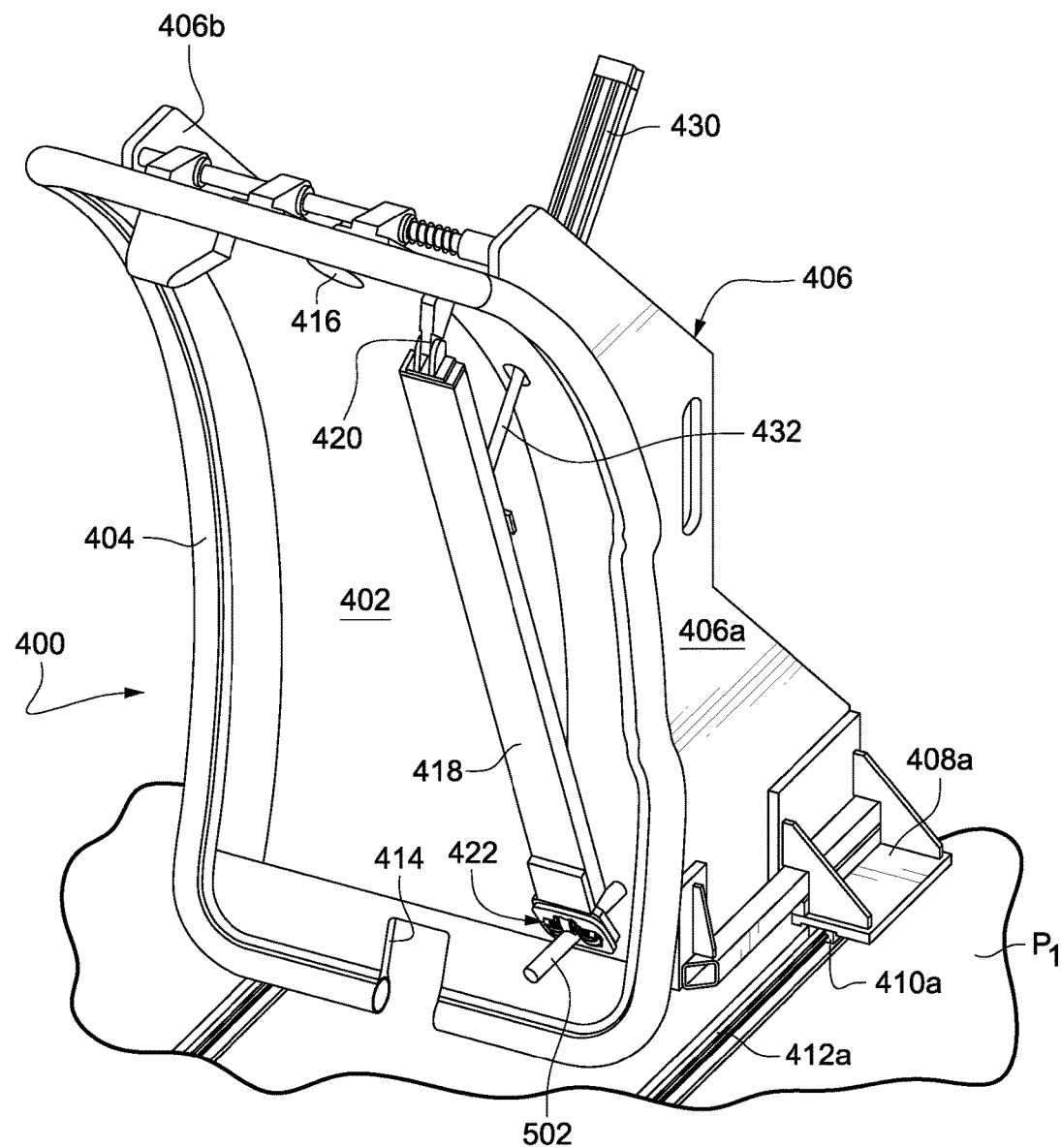
Figure 16:
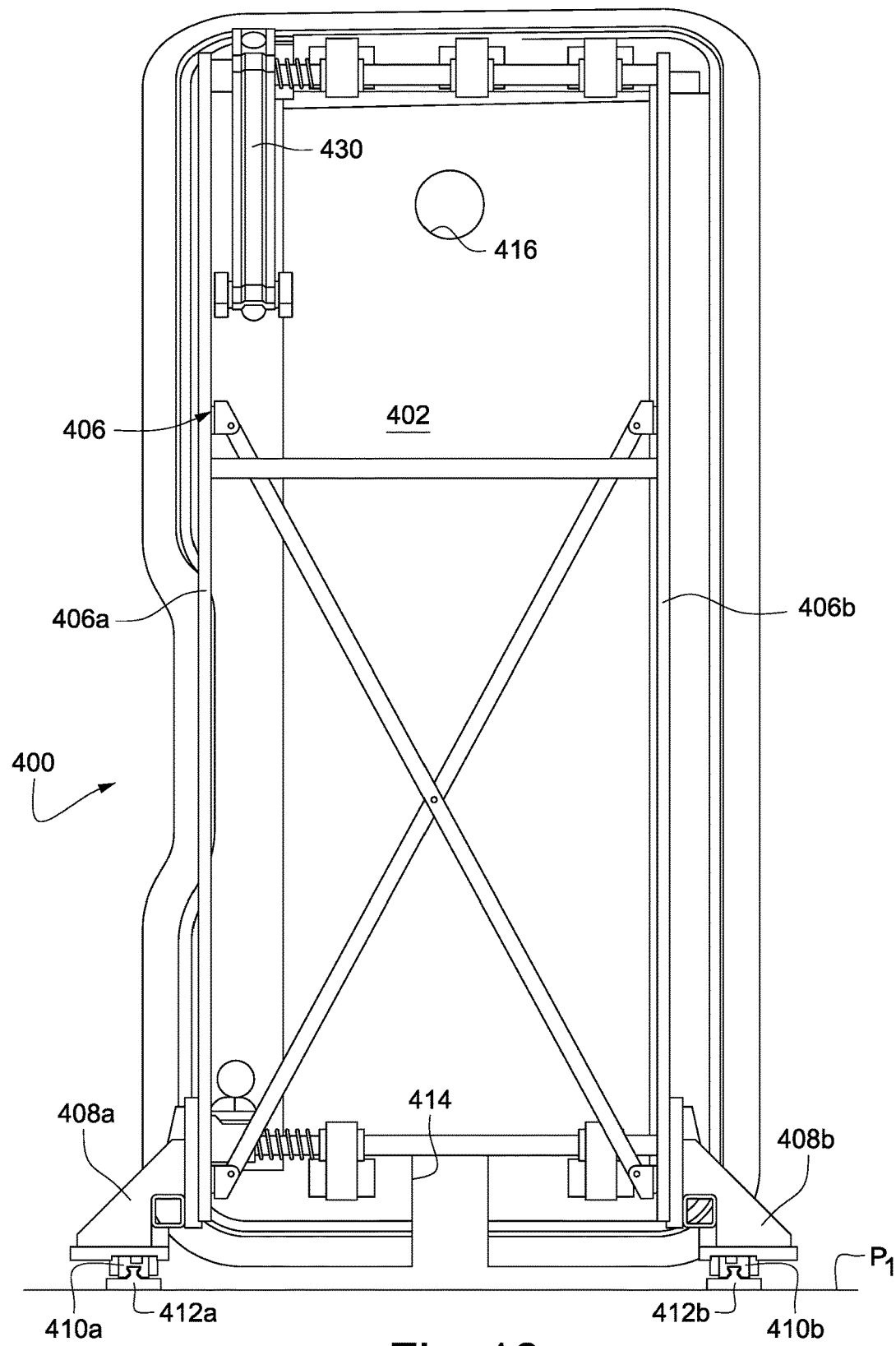
Figure 17:
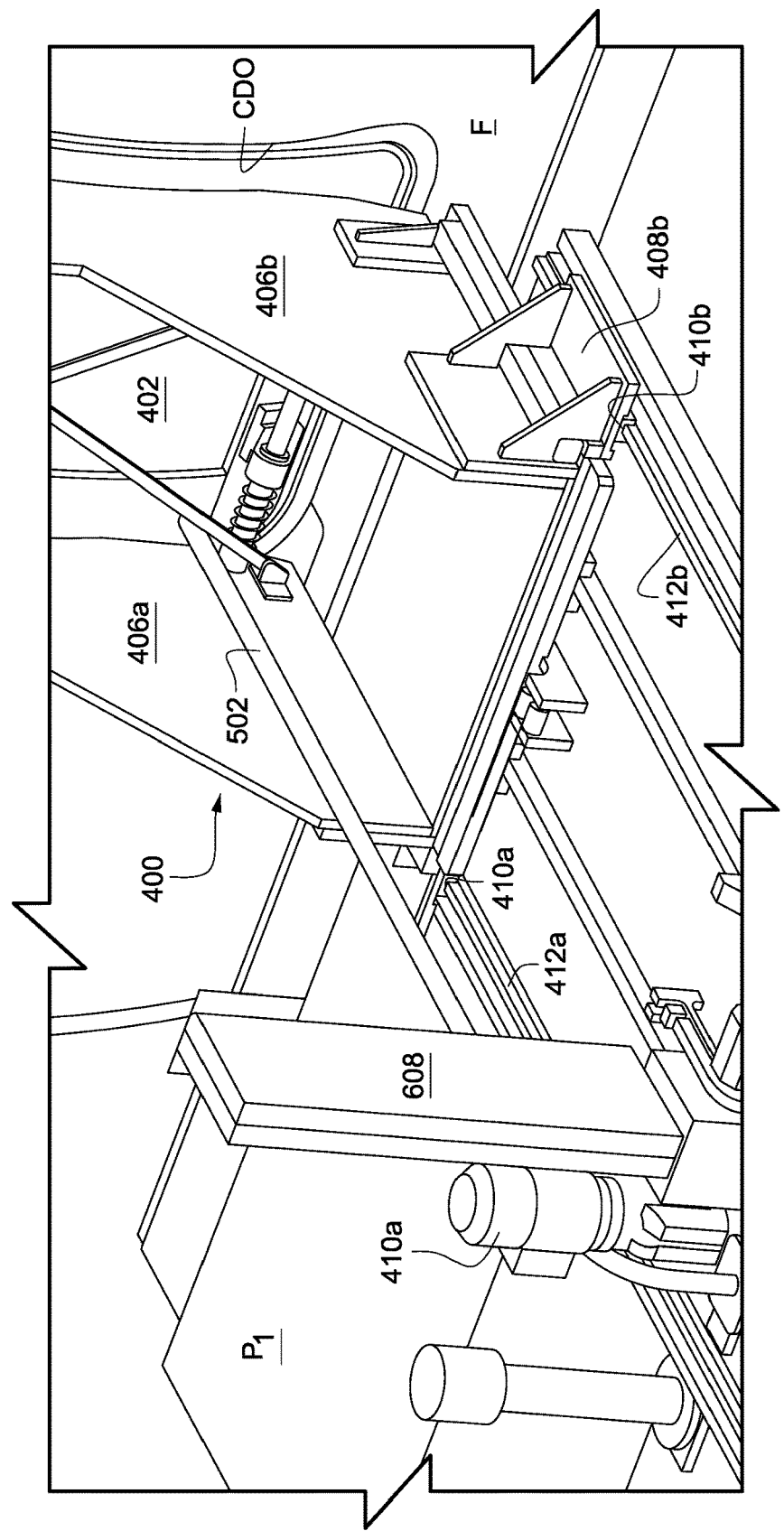
Figure 18:
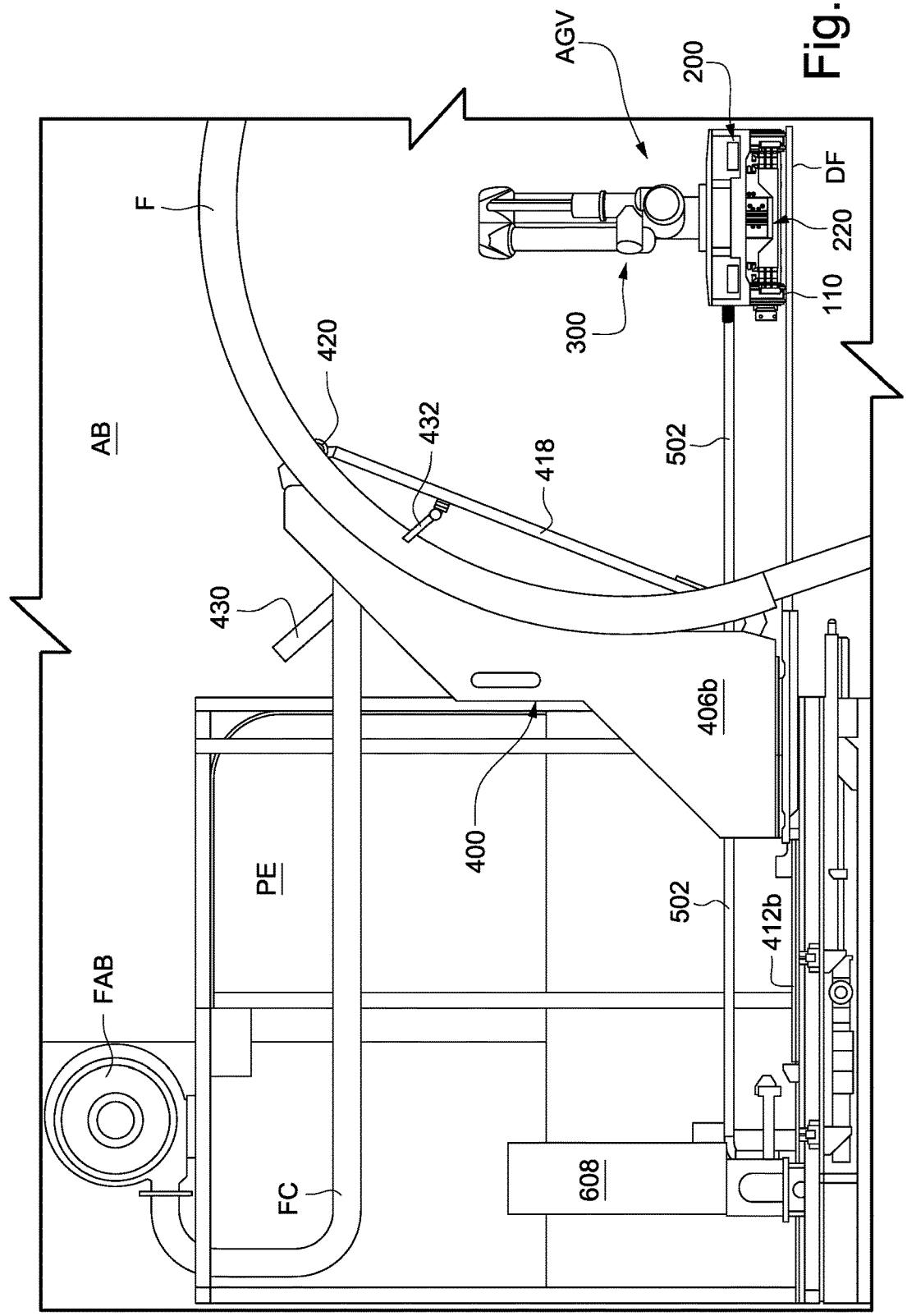
Figure 19A:
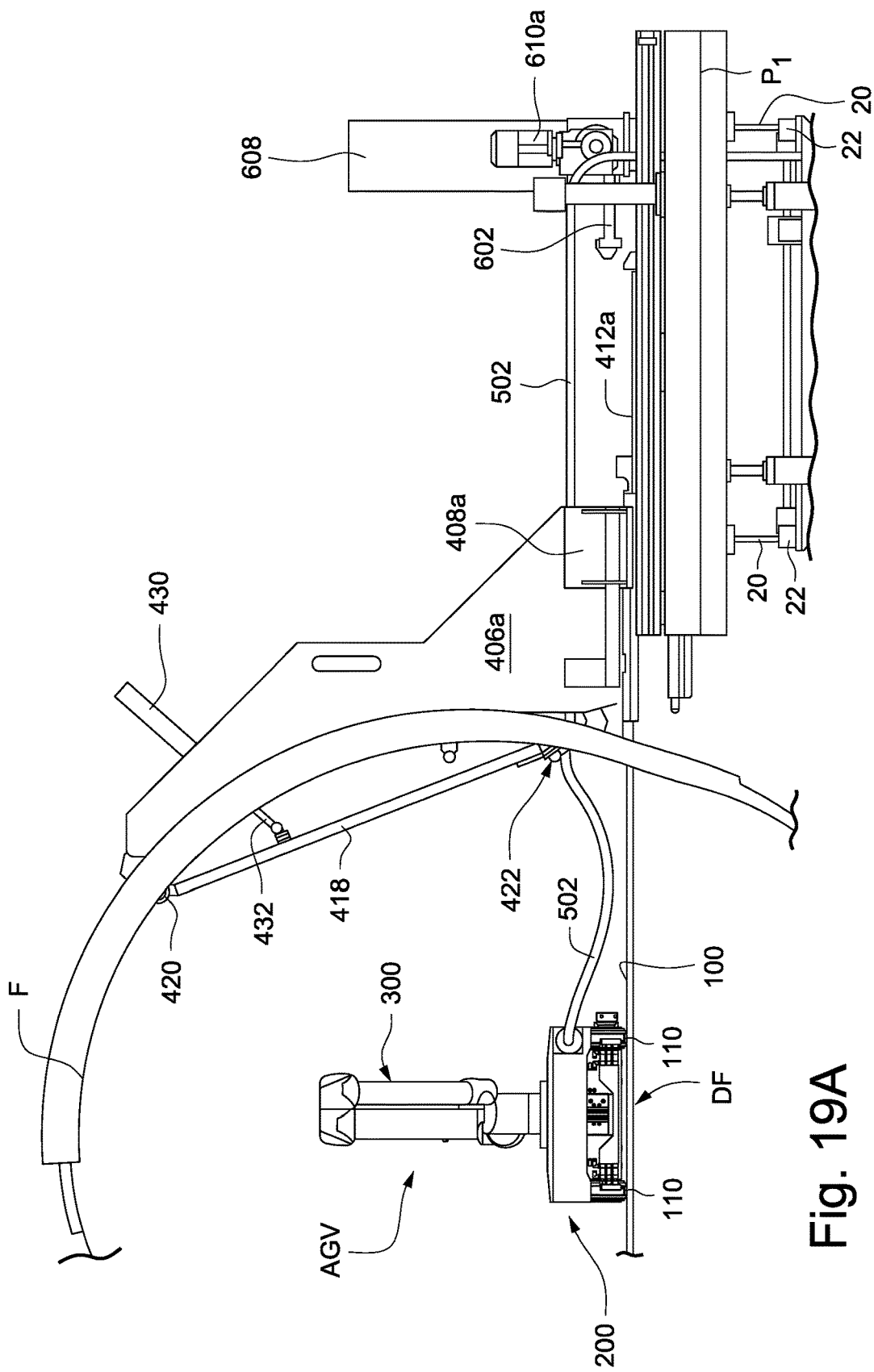
Figure 19B:
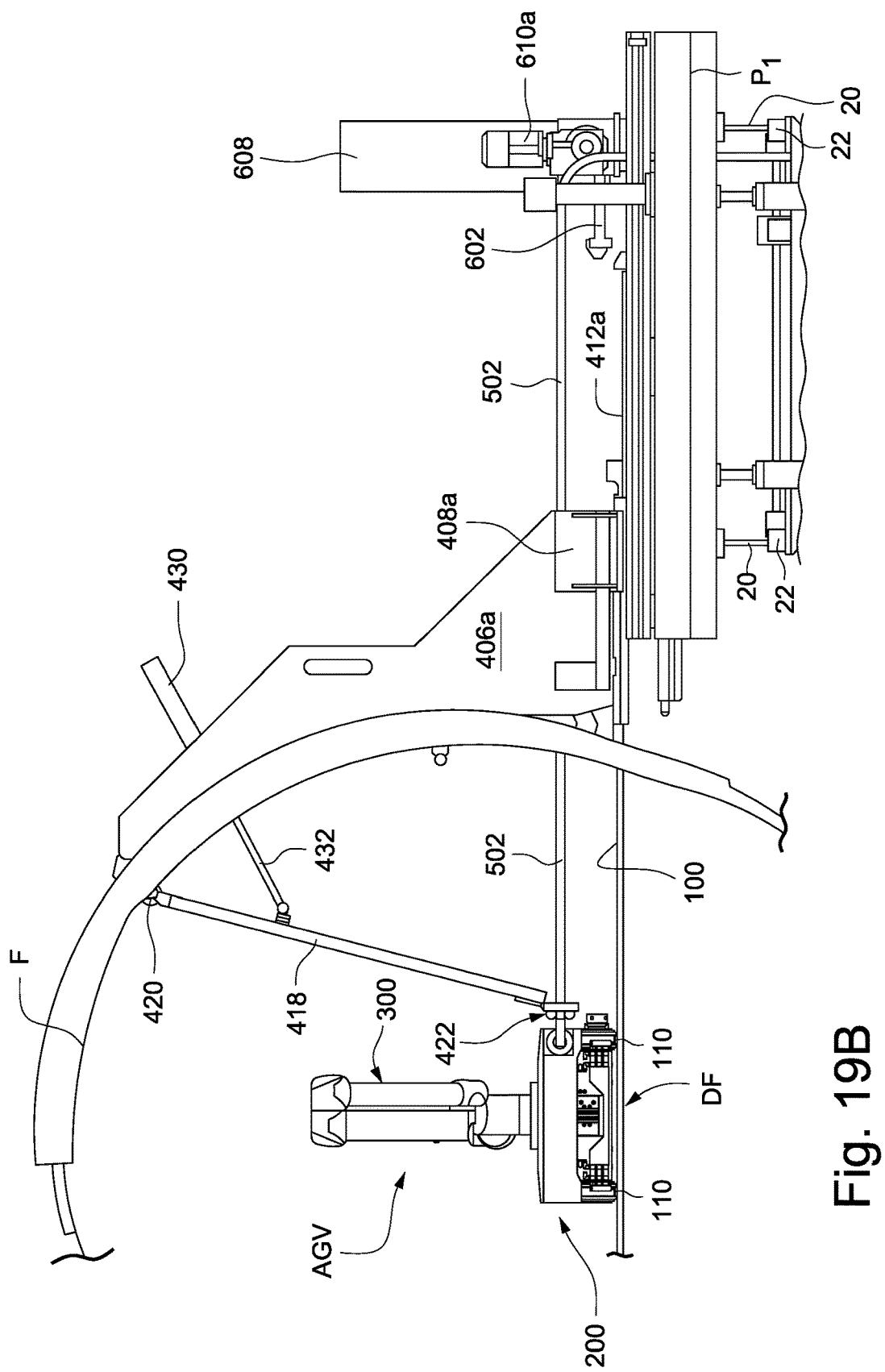
Figure 20:
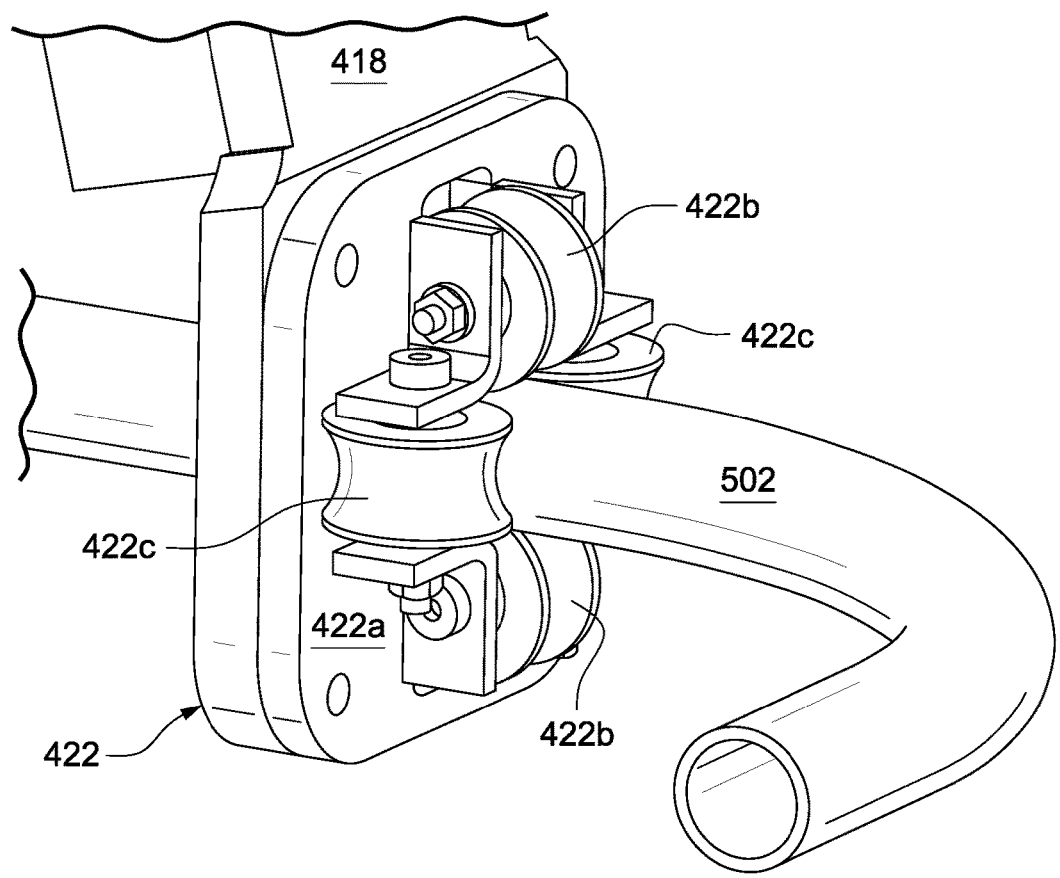
Figure 21:
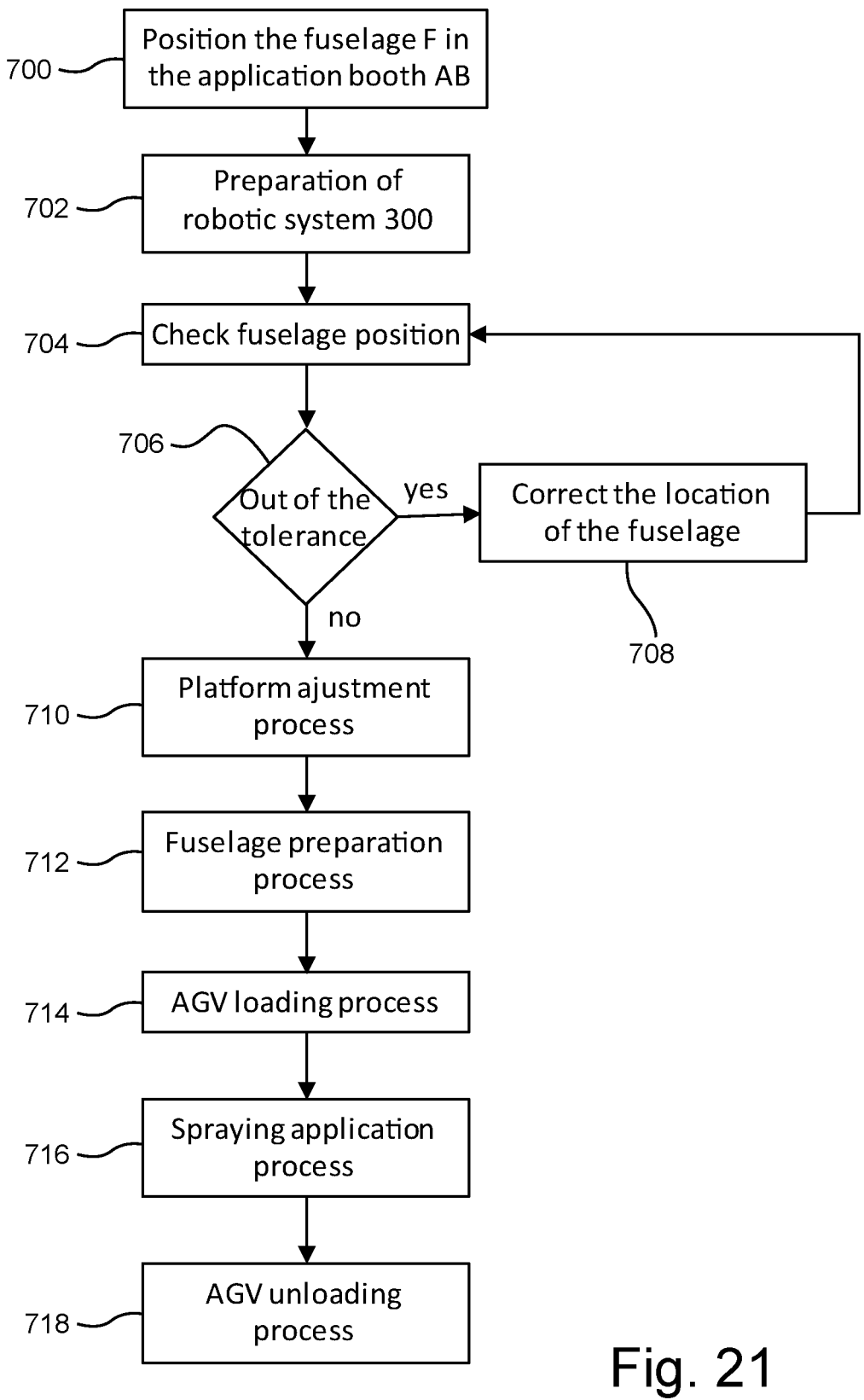

FIGS. 11A-11C depict the deployment of the AGV from its standby position and into the interior of the fuselage, whereby FIGS. 11A and 11B are perspective views of the system which show an exemplary sequence during the deployment of the automatic guided vehicle (AGV) onto a bridge platform and FIG. 11C shows the AGV deployed within the fuselage so that the robotic assembly can apply a treatment liquid onto all interior surfaces thereof;

FIGS. 12A and 12B are enlarged perspective views showing the manner in which the lateral guide rails may be positioned so as to allow movement of the AGV from its standby position on the platform towards the aircraft fuselage;

FIG. 13 is a perspective view of an exemplary rigid chain drive system that may be employed to move the automated guided vehicle (AGV) into and out of its deployed position relative to the aircraft fuselage;

FIGS. 14A and 14B are enlarged perspective views showing the coupling assembly that may be employed to couple the terminal end of the rigid chain drive to the carriage assembly of the automated guided vehicle (AGV);

FIG. 15 is a front perspective view of a sealing door assembly that is employed so as to seal the cabin door opening behind the automated guided vehicle (AGV) once it has been moved within the interior of the fuselage;

FIG. 16 is a rear elevational view of the sealing door assembly shown in FIG. 18;

FIG. 17 is a rear perspective view of the lower portion of the sealing door assembly shown in FIG. 18 and its position on the support platform;

FIG. 18 is side elevational view as depicted looking in the forward direction of the fuselage which shows the relative position of the sealing door assembly and fuselage during operation of the automated guided vehicle (AGV) within the interior of the fuselage;

FIGS. 19A and 19B are similar side elevational views to FIG. 21 but depicted looking in the aft direction of the fuselage which show the operation of the swing arm associated with the sealing door assembly;

FIG. 20 is an enlarged detailed perspective view showing the roller guide assembly associated with the swing arm of the sealing door assembly which is employed so as to guide the umbilical hose from the drum system to the automated guide vehicle (AGV) during the spraying operation within the interior of the fuselage; and FIG. 21 is a flowchart of a fully automated system for applying a fluid to the interior surfaces of an aircraft fuselage showing an exemplary sequence of sub-process steps that may be employed according to an embodiment of the invention.

DETAILED DESCRIPTION

Figure 1:
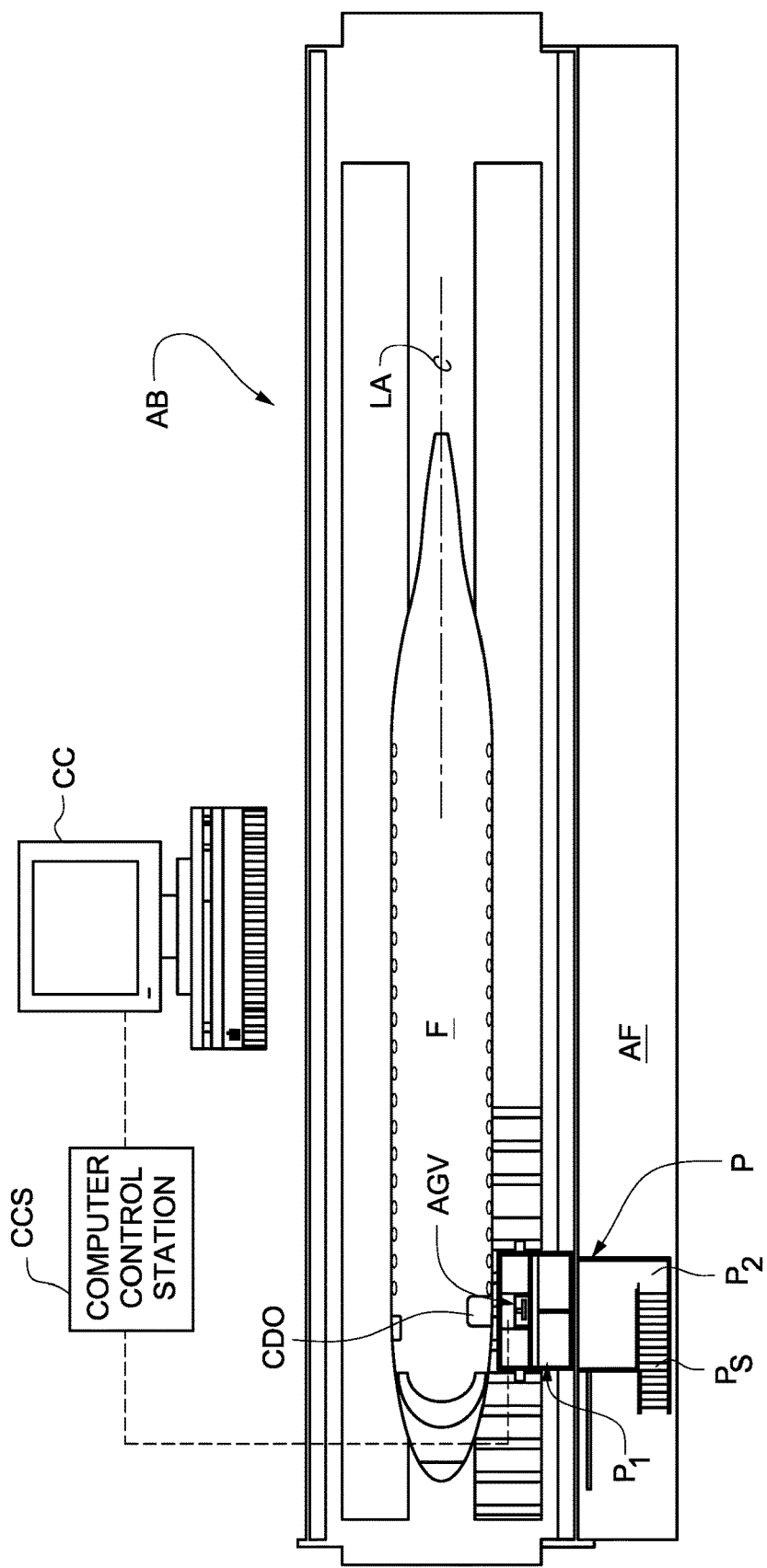
FIG. 1 is a top plan view of an application booth showing an aircraft fuselage positioned operatively adjacent to an automated guided vehicle (AGV) supported in a standby position on a support platform.

An application booth AB is depicted in accompanying FIG. 1 for accommodating an aircraft fuselage F therewithin. The application booth AB includes an elevated platform P laterally of the longitudinal axis LA of the fuselage. The elevated platform includes a forward platform portion P1 which supports the automated guided vehicle (AGV) and is positioned within interior of the application booth AB, and a rearward platform portion P2 which is positioned on the exterior of the application booth AB and includes platform steps PS to allow an operator to access the platform P from the applicator booth floor AF of the application booth AB (see FIG.). As will be described further below, the platform P is capable of being adjusted vertically relative to the main cabin door opening CDO in the fuselage F and supports an automated guided vehicle (AGV). The operator on the platform P may control the automated processes and operation of the AGV via an appropriate input/output control console CC operatively communicating with the non-volatile memory of a computer control station CCS.

Figure 2A:
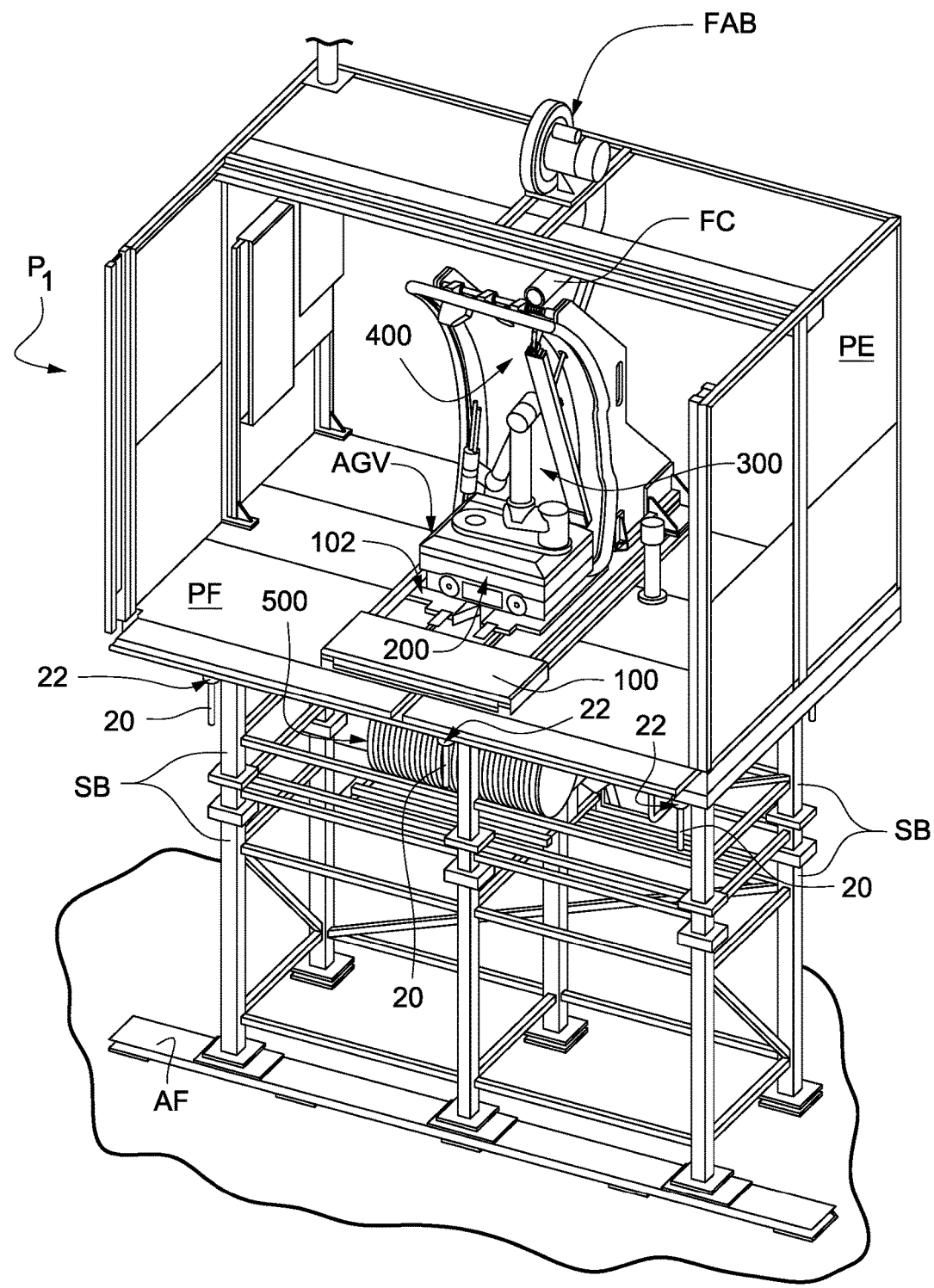
FIGS. 2A-2C are front perspective, rear elevational and lower side elevational views, respectively, of the support platform showing the automated guided vehicle (AGV), sealing door assembly, umbilical hose drum system and other associated components of an embodiment of this invention.
Figure 2B:
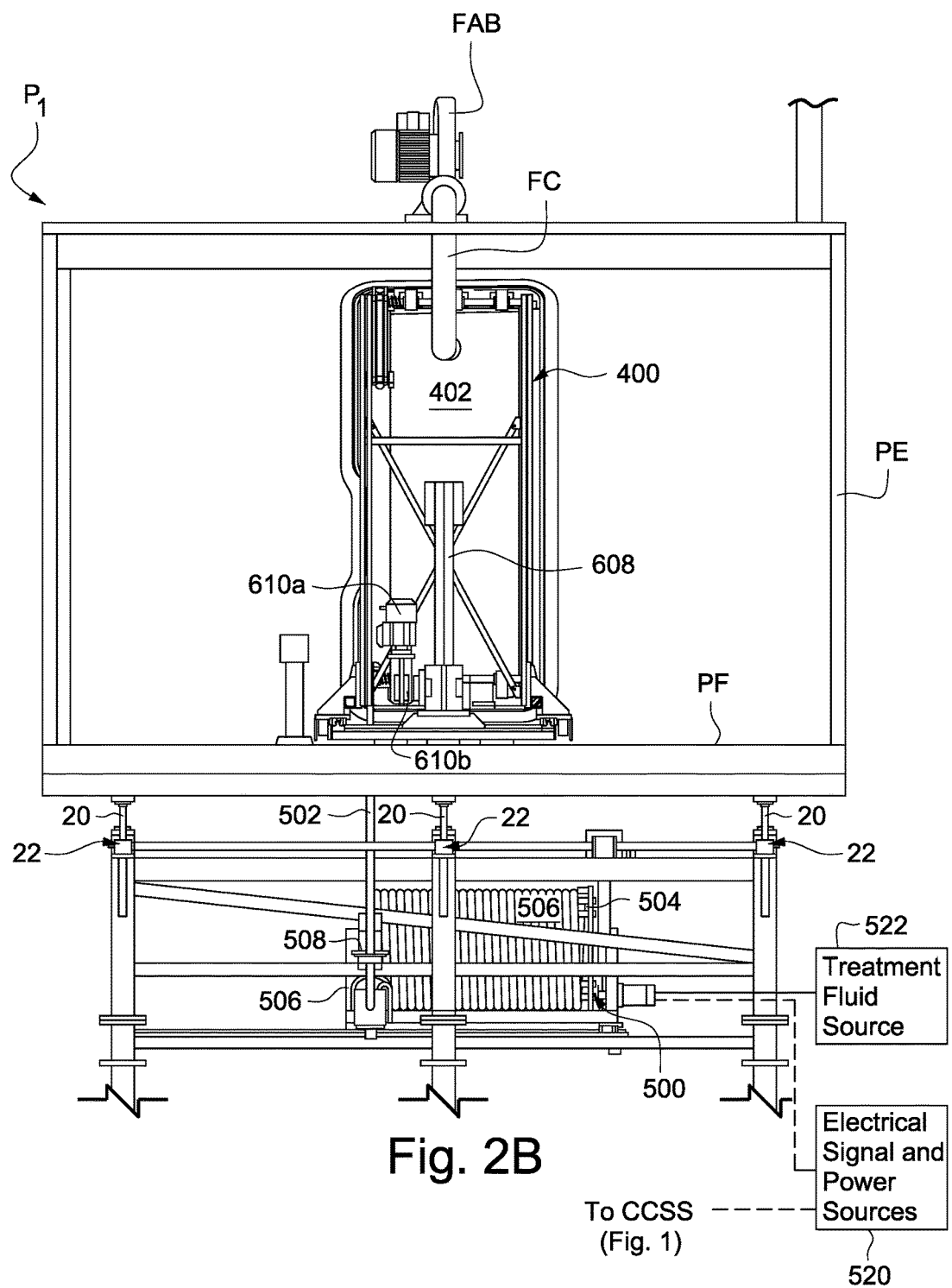
Figure 2C:
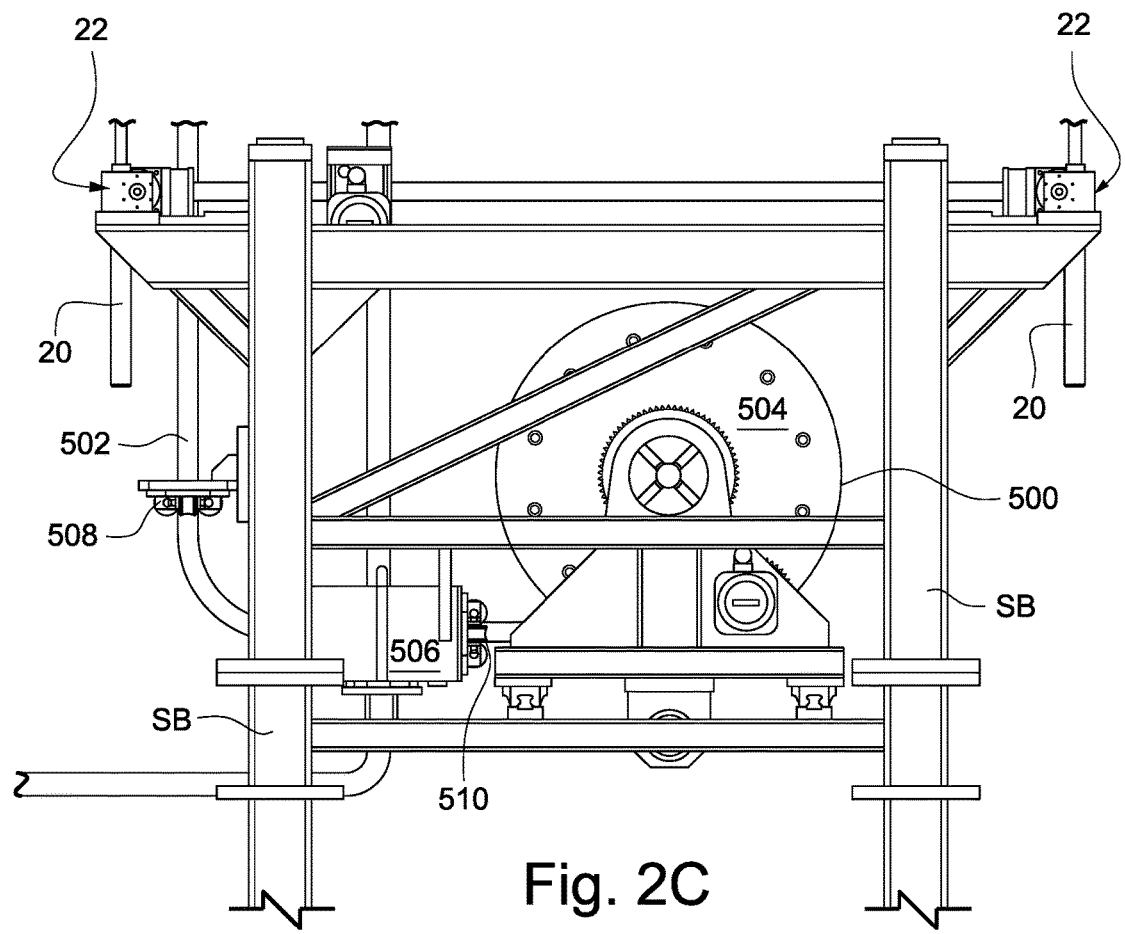
Figure 3:
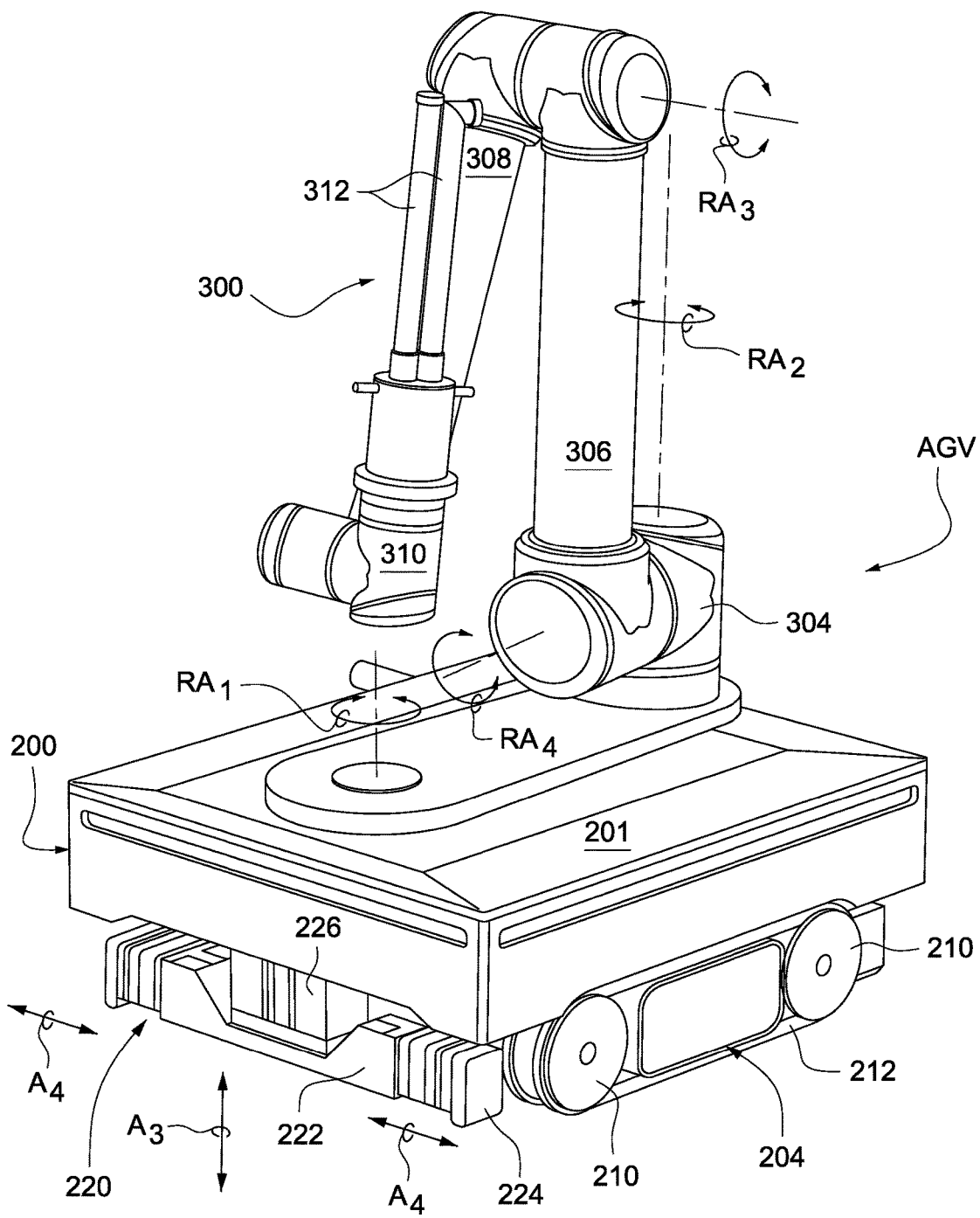
FIGS. 3-4 are perspective views shown from above and below the automated guided vehicle (AGV) employed in the systems and method described herein which depict the carriage and robotic assemblies thereof in greater detail.
Figure 4:
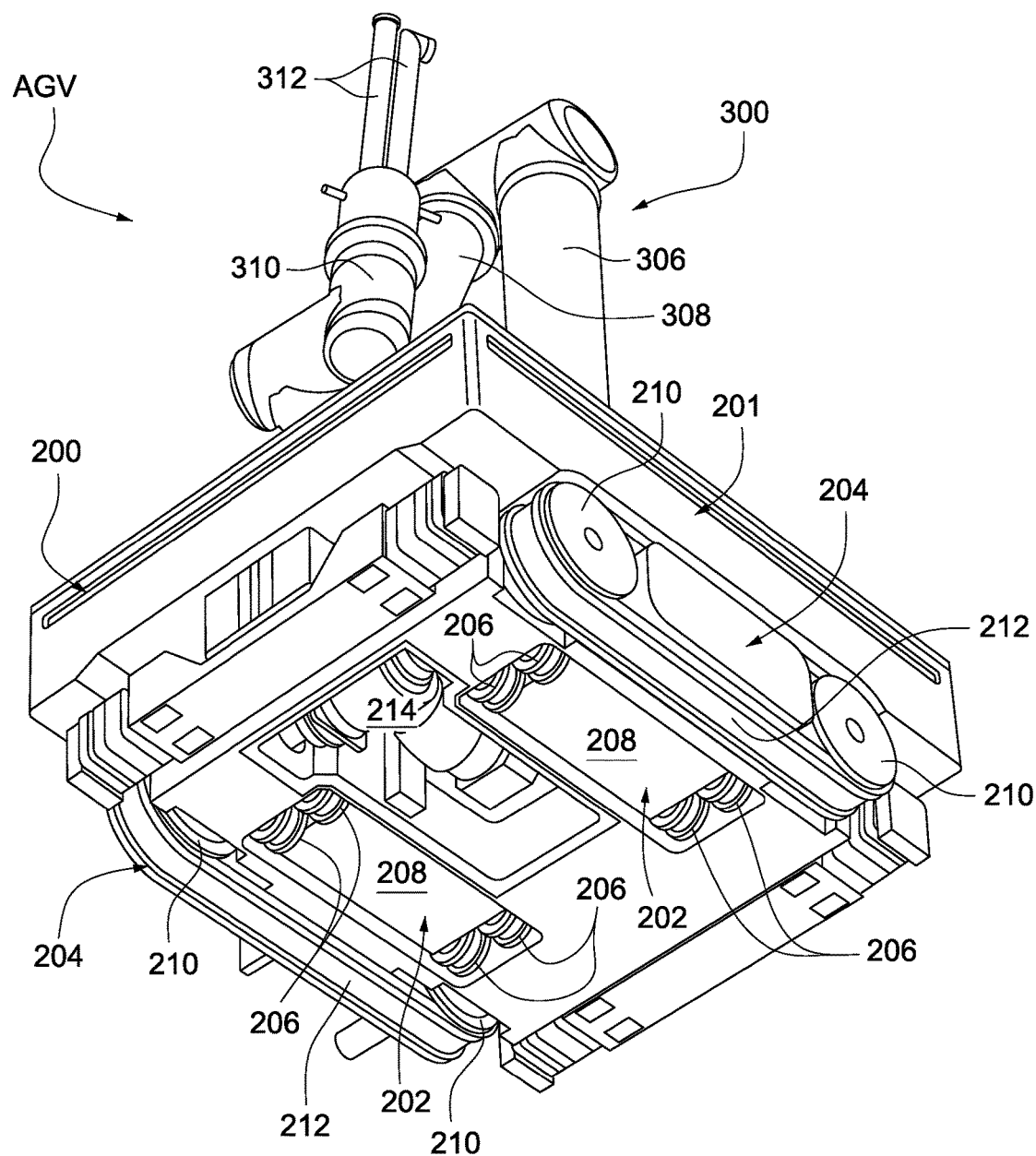
Figure 5:
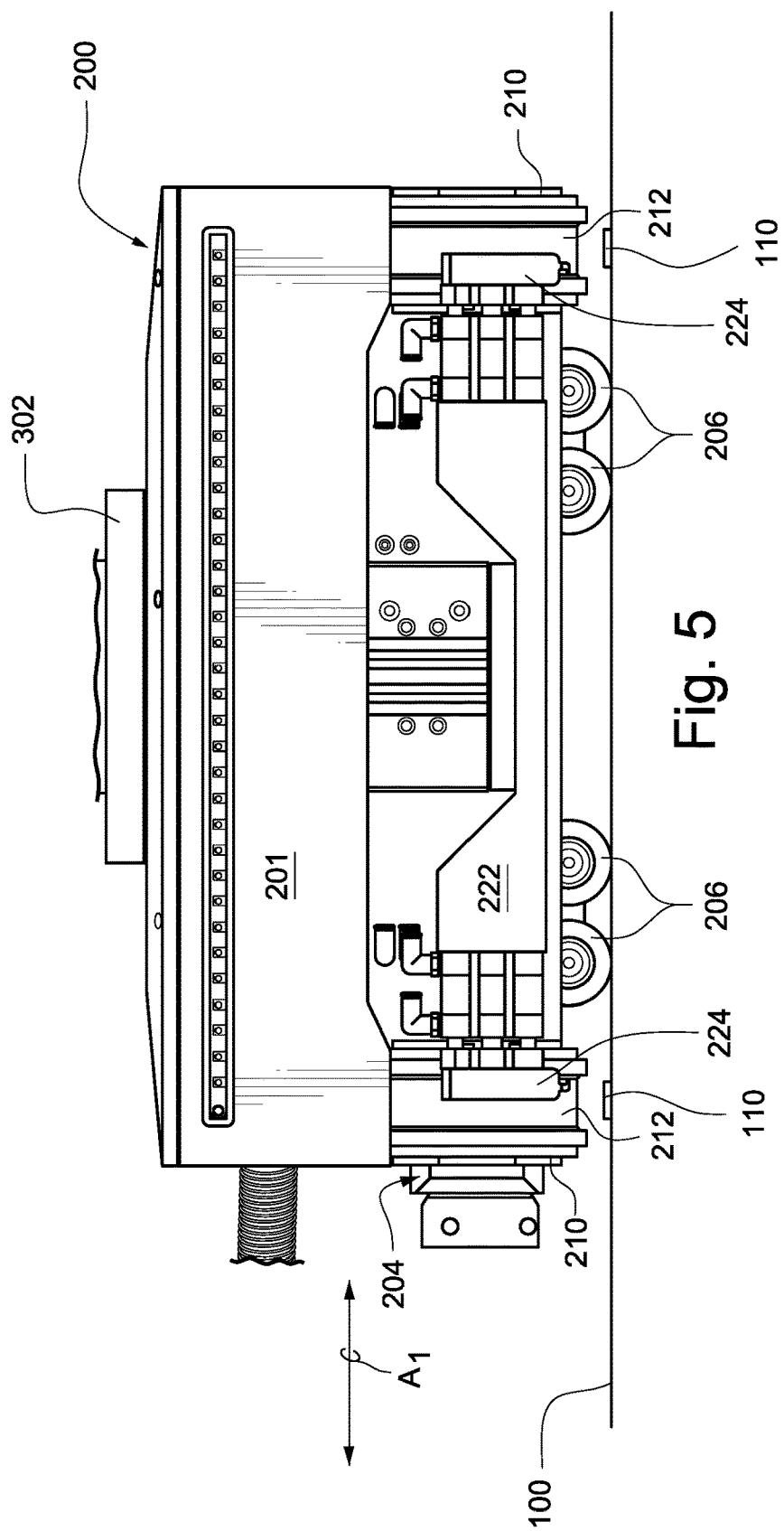
FIGS. 5-6 are side elevational views showing the extended and retracted states, respectively, of the guide wheels associated with the carriage assembly of the automated guided vehicle (AGV)
Figure 6:
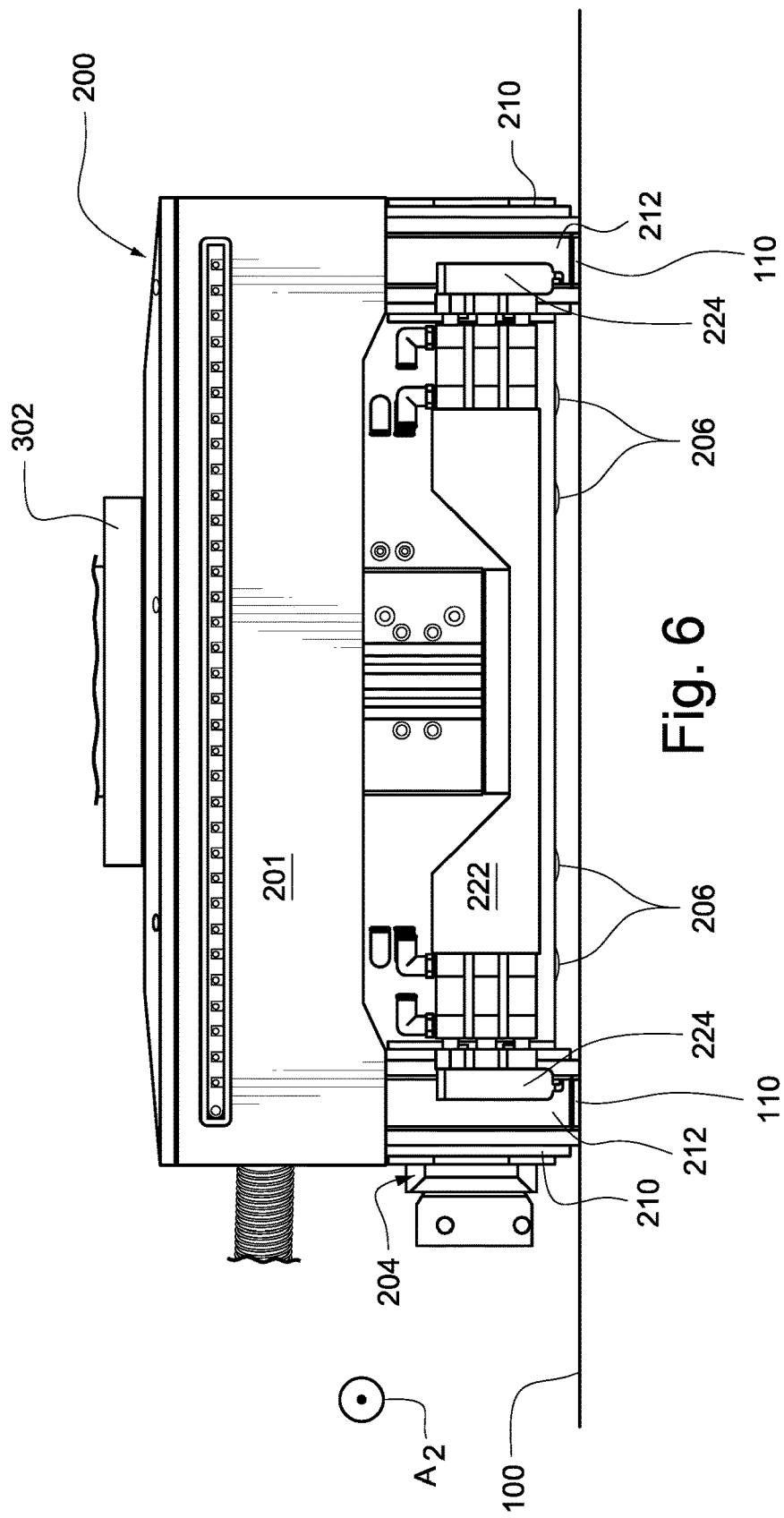
Figure 7A:
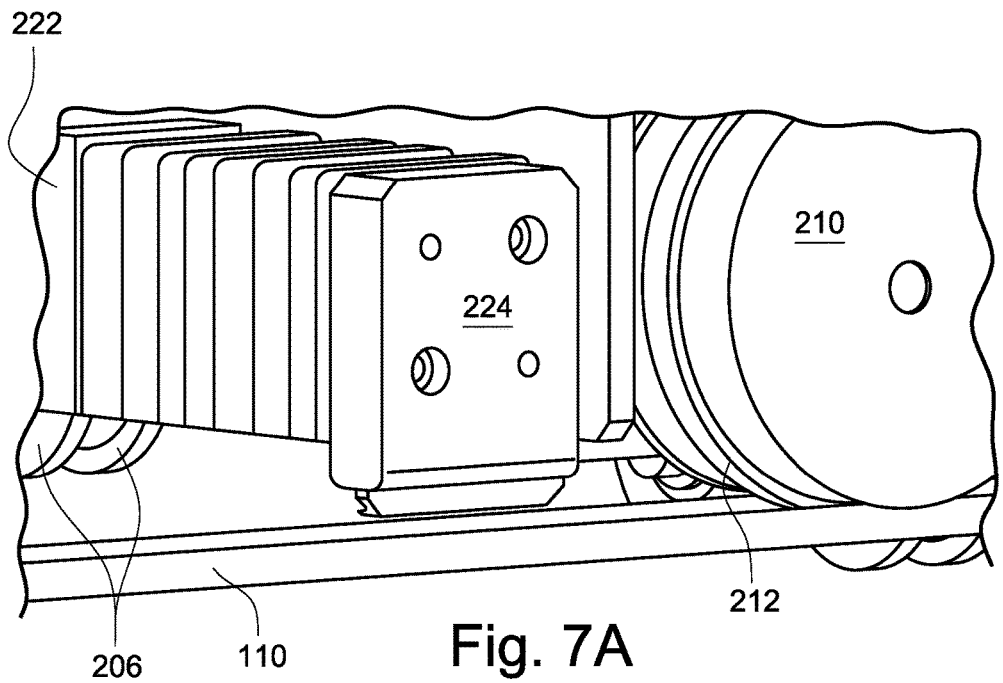
FIGS. 7A and 7B are detailed perspective views of the positional clamping assembly of the AGV which serves to positionally clamp the carriage assembly to the associated guide rails.
Figure 7B:
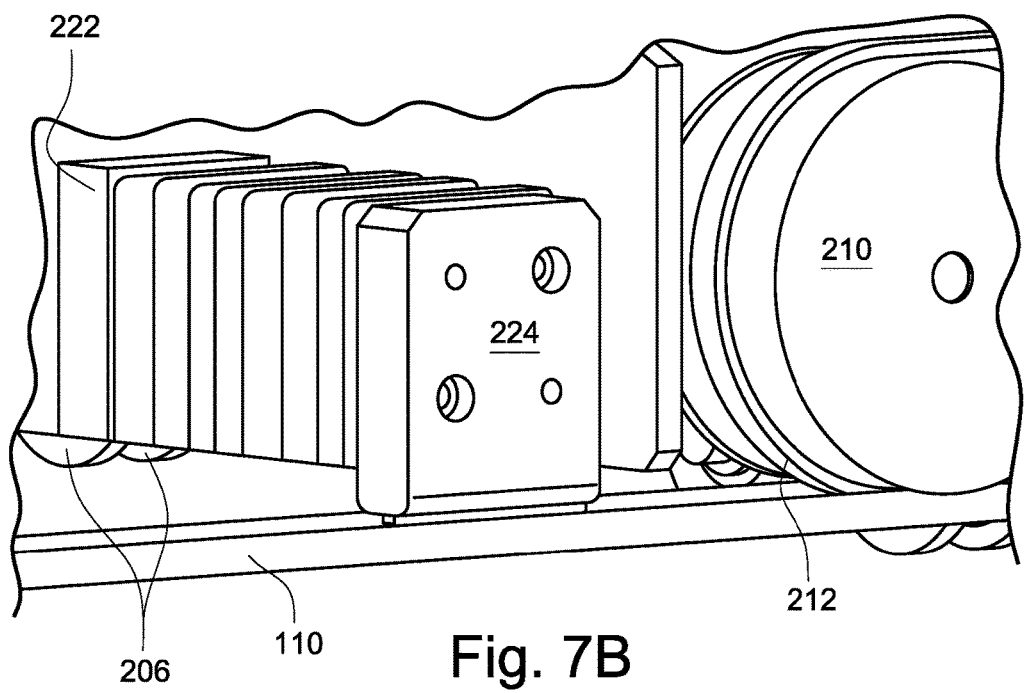

The forward platform portion P1 is shown in a larger scale in accompanying FIGS. 2A-2C. As is shown, the forward platform portion P1 includes structural support beams (a representative few of which are depicted by reference SB) which support a platform floor PF at an upper end thereof. A heat resistant platform enclosure PE is also provided around the perimeter of the platform floor PF so as to protect the operative components located therewithin. The platform portion P1 is mounted to the support beams SB so as to be height adjustable relative to the fuselage F and especially the main cabin door opening CDO. In order to provide such vertical height adjustment, the platform floor PF is supported by a series of vertically oriented jack screw supports 20 which are operatively connected to respective jack screw units 22. Suitable operator input via the operator control console CC will in turn command the jack screw units 22 to operate so as to in turn vertically adjust (raise or lower) the height of the platform PF by extending or retracting the jack screw supports 20. In such a manner, therefore, the platform floor PF can be height-adjusted so as to be in elevational alignment with the main cabin door opening CDO of the fuselage F.

Important to the embodiments disclosed herein, the forward platform portion P1 is provided with a lateral fuselage door rail system 100 that may be assembled when desired so as to provide a track aligned with the fuselage door opening FDO. An AGV deployment bridge platform 102 is provided on the platform portion P1 and is mounted for reciprocal sliding movements towards and away from the fuselage F when positioned within the application booth AB. The AGV deployment bridge platform 102 thus supports the automated guided vehicle (AGV) in a standby position on the platform portion P1 but may be moved outwardly when it is desired to commence an interior spray application process within the interior of the fuselage F.

The automated guided vehicle (AGV) is generally comprised of a lower carriage assembly 200 which supportably carries an upper robotic assembly 300. A sealing door assembly 400 is also positioned on the lateral rail system 100 rearwardly (relative to the aircraft fuselage F) of the automated guided vehicle (AGV). A rotatable drum system 500 is positioned below the platform floor PF of the platform portion P1 so as to supply an umbilical hose 502 to the AGV. The umbilical hose 502 contains multiple fluid conduits and electrical cabling (not shown) so as to enable connection between the automated guided vehicle (AGV) and the carriage and robotic assemblies 200, 300 thereof, respectively, to external electrical power/signal sources and/or fluid sources (e.g., sources of pressurized and/or purge air, treatment fluid sources, controller network signal cables, video signal cables, electrical power cables and the like) shown schematically in FIG. 2B by reference numerals 520 and 522, respectively. The drum system 500 includes a rotatable hose drum 504 around which the umbilical hose 502 is wound so it can be supplied to the AGV during advancement into and along the fuselage F and during retrieval of the AGV onto the platform P1. It will be observed in this regard that the drum system 500 includes a cleaning tank system 506 through which the umbilical hose 502 passes before being wound upon the hose drum 504. The cleaning tank system 506 serves to remove the organic compound overspray that may have accumulated onto the exterior surface of the umbilical hose 502 before being wound upon the drum 504. Guide roll assemblies 508, 510 are provided so as to guide the umbilical hose 502 from the drum 504 through the cleaning tank system 506 and then to the AGV thereabove and vice versa.

FIGS. 3-6 show in greater detail the AGV in accordance with an embodiment of this invention. As noted previously, the AGV is comprised generally of a lower carriage assembly 200 which includes a carriage platform 201 which supports an upper robotics assembly 300. The carriage assembly 200 is provided with a laterally separated pair of deployment guide wheel assemblies 202 and a laterally separated pair of carriage drive assemblies 204. The guide wheel assemblies 202 are in turn provided with aligned pairs of guide wheels 206 connected operatively at each end of a respective one of the reciprocally movable deployment members 208. The carriage drive assemblies 204 are comprised of separated pairs of drive wheels 210 operatively connected to a suitable drive motor and transmission assembly 214 (see e.g., FIG. 3) which serves to propel a drive belt 212.

Figure 8:
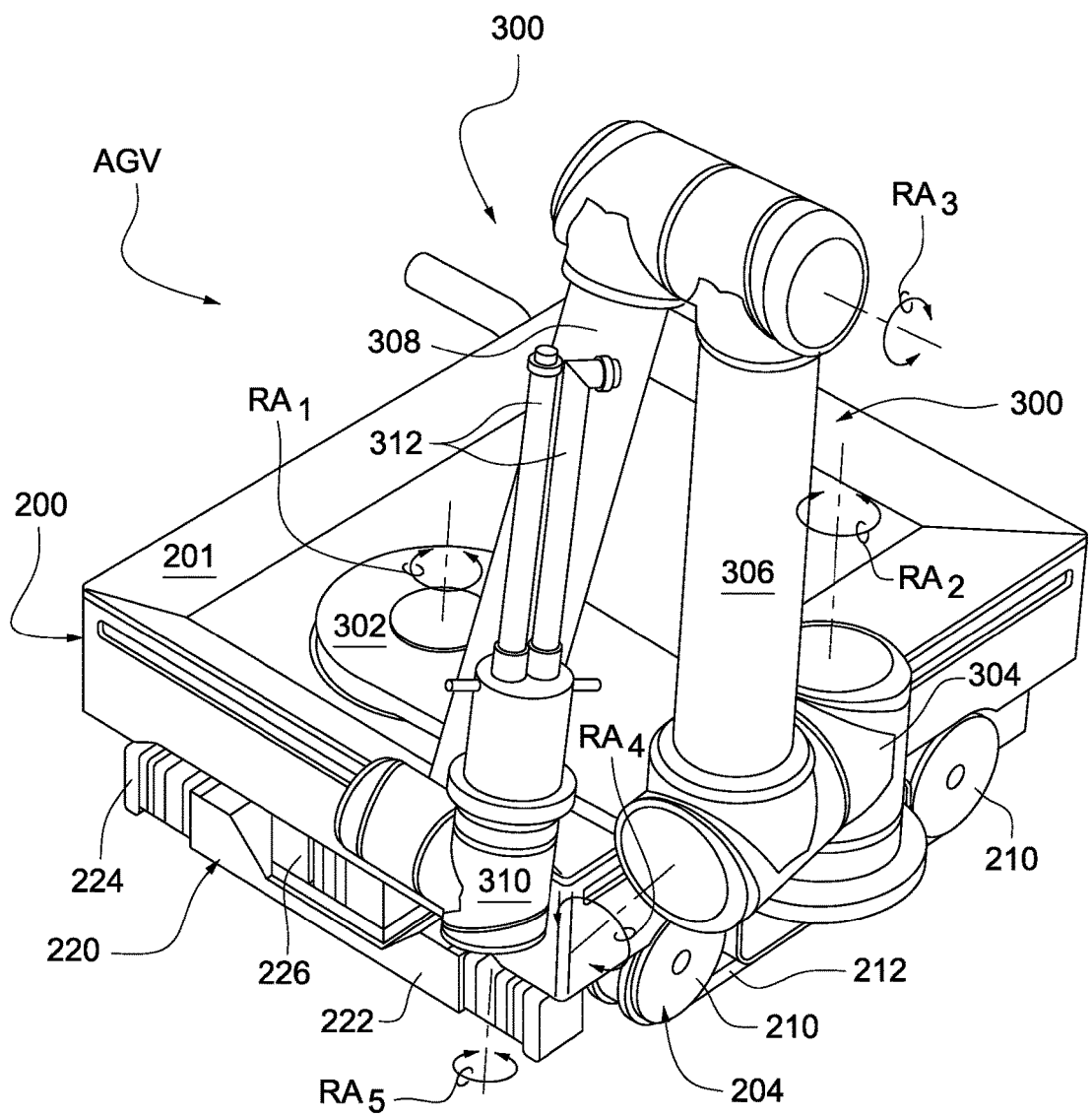
FIGS. 8-10 are perspective views from above of the automated guided vehicle (AGV) showing the various positional freedoms of movement of the robotic assembly thereof.
Figure 9:
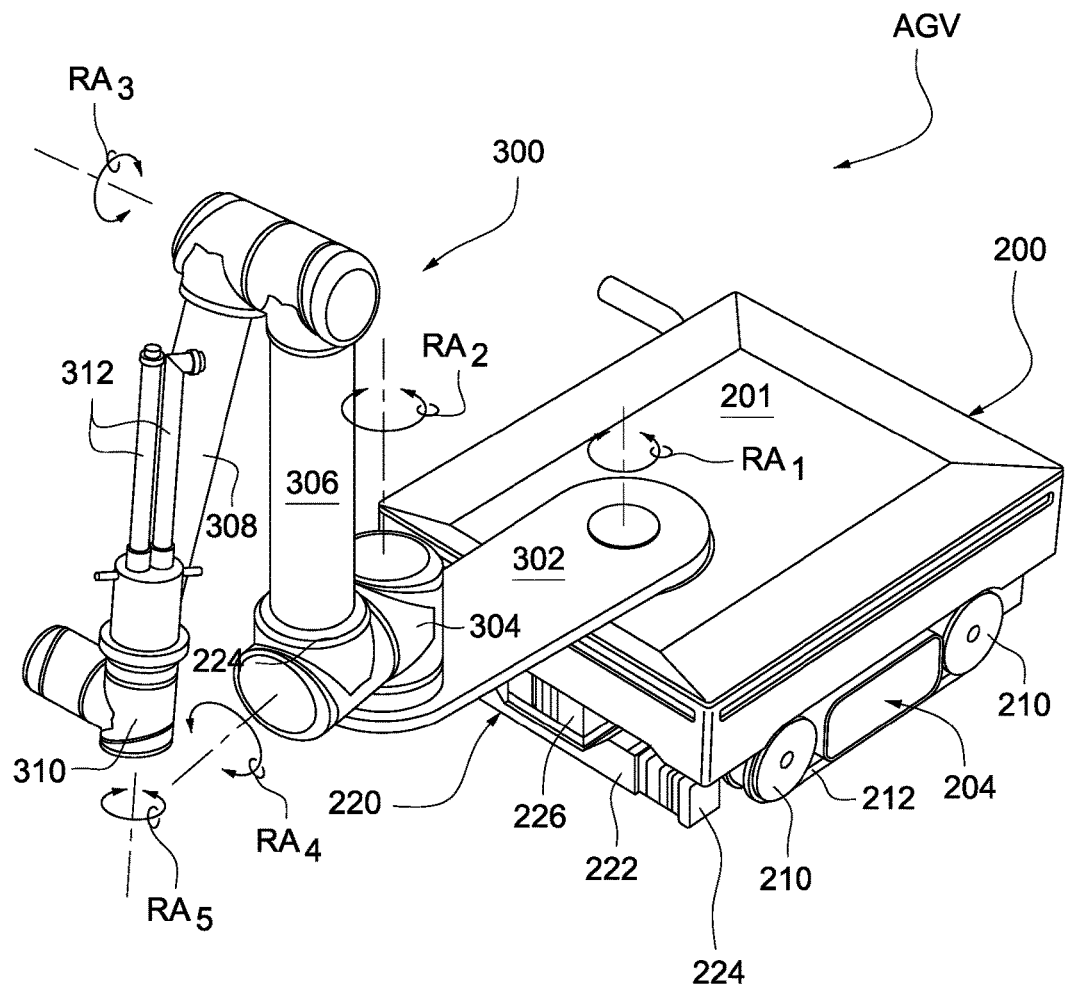
Figure 10:
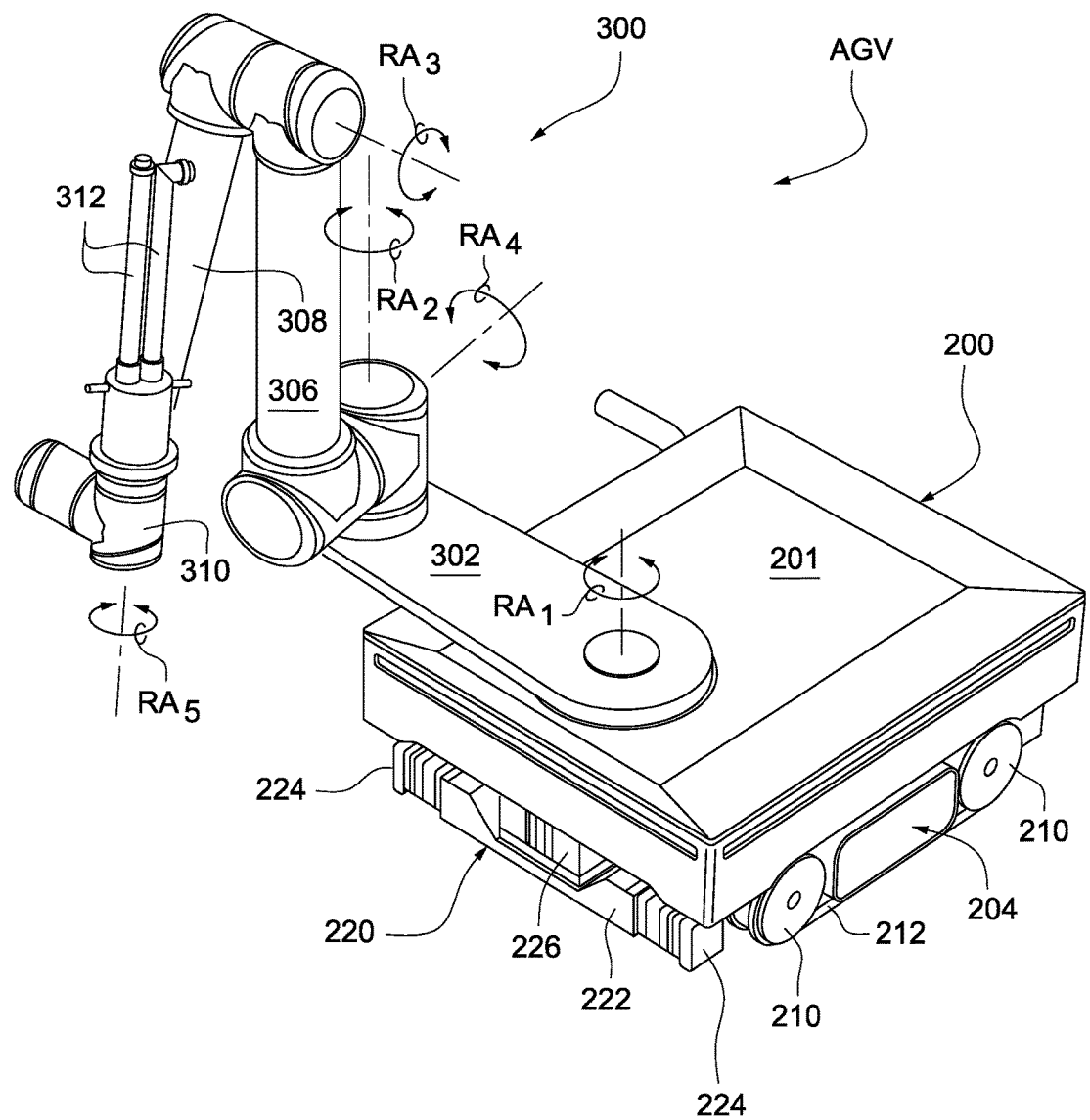

It will be observed that the alignment of the guide wheels 206 of the deployment guide wheel assemblies 202 and the drive wheels 210/drive belt 212 of the carriage drive assemblies 204 are at a right angle (90°) relative to one another. This angular relationship allows the AGV to be moved in one direction when being inserted into the fuselage through the main cabin door opening ADO transverse to the longitudinal direction of the fuselage F and then be propelled in another direction orthogonal to the insertion (deployment) direction parallel to the longitudinal direction of the fuselage F. In this regard, as shown more specifically in FIG. 8, the deployment members 208 of the deployment guide assemblies 202 may be extended from the carriage platform 201 so as to engage the lateral rail system 100. In such an extended condition, the deployment guide assemblies 202 and the drive wheels 210/drive belts 212 thereof are raised above and therefore disengaged with the lateral rail system 100. As such, AGV may be moved reciprocally in the direction of arrow A1 along the rail system 100 so as to insert (deploy) the AGV within the interior of the fuselage F and recover the AGV onto the platform P1 when the fluid application process has been completed therewithin.

Once the AGV has been inserted (deployed) into the interior of the fuselage F, the deployment members 208 of the deployment guide assemblies 202 may then be retracted within the carriage platform 201 so as to lower the drive wheels 210/drive belt 212 into engagement with the interior rail system 110 positioned within the fuselage F in alignment with the longitudinal axis thereof. Such a condition is shown in FIG. 6. The AGV may then be propelled in reciprocal directions transverse to arrow A1 (i.e., into and out of the plane of FIG. 6 as schematically depicted by arrow A2 therein) along the interior rail system 110 within the fuselage F.

In order to securely position the AGV relative to an interior surface area of the fuselage F to be treated with the fluid spray from the robotic assembly 300, the carriage assembly 200 is also provided with a clamp system comprised of a spaced apart pair of clamping assemblies 220. As shown in greater detail in FIGS. 7A and 7B, each clamping assembly 220 includes a transversely oriented clamp arm 222 which operatively carries at each end a respective clamp pad 224. The clamp arms 222 are mounted to the carriage 201 by a support column 226 which is capable of moving the clamp arms 222, and thus the clamp pads 224 carried thereby, vertically towards and away from the rail system 110 (i.e., in the direction shown by arrow A3 in FIG. 3). The clamp pads 224 are also capable of being reciprocally moved substantially horizontally (i.e., in the direction of arrow A4 in FIG. 3). In such a manner, therefore, the operator may cause the automated guided vehicle (AGV) may be allowed to move along the rail system 110 within the interior of the fuselage F when the clamp blocks are retracted (i.e., a state as depicted by FIG. 7A) but can periodically be positionally locked down to the rail system 110 when the clamp pads 224 are extended into contact therewith (i.e., a state as depicted by FIG. 7B) to thereby securely, but temporarily, position the automated guided vehicle (AGV) relative to an interior surface region to be sprayed with the treatment fluid.

Accompanying FIGS. 8-10 depict the automated guide vehicle AGV with one embodiment of a robotic assembly 300 that may be operatively mounted onto and carried by the carriage assembly 200. As shown, the robotic assembly 300 includes an elongate base plate 302 which is asymmetrically mounted at one end to the carriage assembly 200 for rotation about a substantially vertical rotation axis RA1. A support pedestal 304 is mounted to the opposite end of the base plate 302 for rotational movement about a substantially vertical rotation axis RA2. Aft and fore arms 306 and 308 are connected to one another at respective distal and proximal ends thereof so as to be rotatable about a rotation axis RA3. The aft arm 306 is in turn rotatably connected to the support pedestal to allow for rotation about rotation axis RA4. A spray head 310 is operatively connected to the distal end of the fore arm 308 for rotational movement about the rotation axis RA5. It will therefore be observed that the spray head 310 is capable of assuming virtually any position with respect to the interior surfaces of the fuselage F by controlled manipulation of the base plate 302, support pedestal 304, arms 306, 308 and spray head 310 by relative rotation about rotation axes RA1-RA5. A representative few such positional possibilities for the robotic assembly 300 are depicted in FIGS. 3 and 8-10. In such a manner, therefore, a map of the interior surfaces of the fuselage F can be stored in the non-volatile memory of the computer control station CCS so as to cause the spray head 310 of the robotic assembly 300 to direct a spray of treatment fluid onto all areas in need of fluid application. In this regard, fluid may be supplied to the spray head 310 from an available standby supply thereof via conduits 312.

FIGS. 11A-11C depict the deployment of the AGV from its standby position on platform P1 and into the interior of the fuselage F. Specifically, when it is desired to initiate a fluid spraying operation, the operator will install the interior rails 110 onto the transverse floor beams FB coincident with the longitudinal axis of the fuselage F (see FIG. 11C) as well as the lateral rail system 100 (a few sections of which are shown in a standby state on platform P1 in FIG. 2A). The lateral rail system 100 is at a substantially right angle relative to the interior rails 110. As shown in FIGS. 11A and 11B, once the lateral rails 100 have been positioned, the AGV deployment bridge platform 102 may then be slideably moved towards the fuselage F so that the AGV supported thereby can thereafter be removed from the deployment bridge platform 102 and propelled toward and away from the main fuselage door opening FDO of the fuselage F as shown by the directional arrow A3 in FIG. 11B.

It will be understood that during movement of the automated guided vehicle (AGV) toward the main fuselage door opening FDO, the guide wheels 206 will be extended so as to be in rolling engagement initially with the rails 102*a* of the deployment bridge platform 102 and thereafter with the rails 100 as shown in FIG. 6 and discussed previously above. Once the AGV has entered the interior of the fuselage F and is positioned so that the belt drives 212 are aligned with the rails 110. Thereafter, the AGV may be propelled along the rails 100 so that the robotic assembly 300 can be maneuvered as needed to spray the entire interior surfaced of the fuselage F both above and below the floor beams FB as shown in FIG. 11C. During the spray operation, the fuselage door opening FDO will be closed by the door assembly 402 as will be described in greater detail below.

In order to ensure proper alignment of the support platform rails 102*a* with the rails 100 so the automated guided vehicle (AGV) may be transferred reliably from its ready position on the AGV support platform 102 toward the fuselage door opening FDO, the bridge platform 102 is provided with a V-shaped tongue 104a that is received within a conformably V-shaped recess 104b of the initial section of the rail system 100 (see FIGS. 12A and 12B). A pair of bridge rail members 106 are provided at a forward edge of the deployment bridge platform 102 and are pivotally moveable between a raised position as shown in FIG. 12A and a lowered position as shown in FIG. 12B so as to provide aligned rails bridging the platform 102 and the initial section of the rail system 100 when the V-shaped tongue 104a and recess 104b are docked with one another. In such a manner, the bridge rail members 106 thereby allow the automated guided vehicle (AGV) to be moved from the bridge platform 102 as shown in FIG. 11A and onto the rail system 100 as shown in FIG. 11B.

Deployment of the bridge platform 102 is accomplished by a chain drive system 600 as shown schematically in FIG. 13. The chain drive system 600 according to the depicted embodiment includes an axially rigid chain section 602 comprised of a series of chain links (a few of which are identified in FIG. 13 by reference numeral 602a). The axially rigid chain section 602 will thus allow the load of the deployment platform 102 and the automated guided vehicle (AGV) positioned thereon to be propelled in a push/pull manner in a horizontal direction (i.e., in the direction of arrow A3 in FIGS. 11B and 13).

The distal end of the rigid chain section 602 will include a hitch assembly 604 having an opposed pair of hitch posts 606 extending outwardly therefrom. The chain drive system 600 will include a rearward chain link accumulator tower 608 which accumulates the rearward portion of the chain links 602a when disassembled from one another. Motive power is supplied to the chain links 602a by a drive motor system 610 which includes a drive motor 610a and a transverse drive assembly 610b operatively interconnecting the motor 610a and the chain links 602a. By operation of the motor 610a, therefore, the chain links 602a can be moved reciprocally in the direction of arrow A3 so as to form the rigid chain section 602 and thereby drive the deployment platform 120 connected to the distal end thereof. The distal end of the rigid chain section 604 may be supported during axial movements in the direction of arrow A3 by a roller assembly 612 (see FIGS. 14A and 14B). A sufficient number of chain links 602a are provided so as to establish a rigid chain section 602 capable of propelling the automated guided vehicle (AGV) into and out of the interior of the fuselage F, i.e., so as to allow positioning of the AGV onto the interior rails 110 from its standby position on the platform 102 during an fluid application process and then be recovered from the interior of the fuselage F in an opposite manner. Rigid chain drive systems are in and of themselves well known and are commercially available from Serapid Inc. of Sterling Heights, Mich. USA.

As is shown in greater detail by FIGS. 14A and 14B, the hitch assembly 604 may be coupled to the carriage platform 201 by advancing the rigid chain section 602 towards a receiver assembly 614 associated with a rearward end of the platform 201 in the direction of arrow A4 (see FIG. 14A). The receiver assembly 614 includes an opposed pair of L-shaped hitch blocks 616a, 616b that define a space 618 sized and configured to receive therein the hitch posts 606. Upon the hitch posts 606 being advanced into the space 618, therefore, the hitch blocks 616a, 616b may then be moved in the direction of arrows A5a and A5b, respectively (e.g., via suitable hydraulic or electric actuators not shown) so as to positionally capture the posts 606 within the space 618. The space 618 is configured so as to allow vertical movements of the posts 606 therewithin so as to accommodate surface irregularities when the platform 201 is moved by the rigid chain section 602. However, reliable axial force may be transmitted from the rigid chain section 602 to the platform 201 by virtue of the captured relationship between the posts 606 and the hitch blocks 616a, 616b.

Once the automated guided vehicle (AGV) has been positioned onto the interior rail system 110, the hitch assembly 604 may be disconnected from the carriage platform 201 and retracted back so the links 602a may be positioned within the accumulator 608. The sealing door assembly 400 may then be positioned at this state of the application preparation phase so as to close the main fuselage door opening FDO which will be described in reference to accompanying FIGS. 15-18 and FIGS. 19A-19B. In this regard, a more detailed view of the sealing door assembly 400 is shown specifically in FIGS. 15 and 16. As depicted, the door assembly 400 includes an arcuate door 402 that conforms to curvature of the fuselage F and to the size and shape of the opening FDO therein. A rubber door seal 404 is provided along the perimetrical edge of the door 402 so as to seal off the interior of the fuselage F when the door assembly 400 is positioned so as to close the opening FDO.

The door 402 is carried forwardly of a door carriage assembly 406 having laterally opposed side panels 406a, 406b each of which is rigidly connected at a forward edge thereof to the door 402. The lower ends of the side panels 406a, 406b include lateral supports 408a, 408b each of which includes glide bearing assemblies 410a, 410b operatively connected to door guide rails 412a, 412b to allow the door 402 to be manually pushed from its standby position on the platform P1 and into a closed position whereby the door opening FDO is closed.

The door 402 will also include a lower U-shaped access opening 414 which is sized and configured to allow the rigid chain section 602 to extend therethrough when the automated guide vehicle (AGV) is being positioned within the interior of the fuselage F while the door assembly 400 remains in a stand position on the platform P1. An upper opening 416 is also provided through the door 402 to allow connection to a flexible conduit FC which is operatively connected to a fresh air blower FAB located on the platform enclosure PE (see FIGS. 2A and 2B) and thereby allow fresh air to be introduced into the interior of the fuselage F. This will also allow the space within the application booth AB on the outside of the fuselage to be heated (e.g., to about 60° C.) to thereby allow other automated processes to proceed on the exterior fuselage surface (e.g., exterior surface preparation and/or painting by robotic assemblies not shown).

An interior swing arm 418 is hinged at an upper end thereof to the door 402 by a hinge assembly 420 and extends downwardly therefrom to terminate in a roller guide assembly 422 at the opposite lower end thereof. The roller guide assembly 422 is sized and configured to receive the umbilical hose 502 that extends between the automated guide vehicle (AGV) and the hose drum 504 of the rotatable drum system 500. An actuator rod 432 of a hydraulic actuator 430 is connected operatively to the swing arm 418 so as to move it from the retracted position as shown in FIG. 19A and into an extended position as shown in FIG. 19B.

A more detailed view of the roller guide assembly 422 is depicted in FIG. 20. As shown, the assembly 422 is provided with a guide plate 422a that is rigidly attached to the terminal (lower) end of the swing arm 418. Opposed pairs of rollers 422b, 422c are mounted to the guide plate 422a for rotation about respective mutually orthogonal axes and serve to rollably engage the umbilical hose 502. In operation, therefore, the advancement of the umbilical hose 502 to the automated guided vehicle (AGV) during spray applications within the interior of the fuselage F will be facilitated by repeated swinging movements of the swing arm between its retracted position as shown in FIG. 19A and its extended position as shown in FIG. 19B. That is, while the drum 504 of the drum system 500 is operated so as to unwind the umbilical hose 502 therefrom when the automated guided vehicle (AGV) is moved rearwardly within the fuselage F, any excess length of hose 502 created within the interior of the fuselage F can be driven or pushed to the automated guided vehicle (AGV) by moving the swing arm between its retracted and extended positions. Moreover, while in the extended position, the roller guide assembly 422 more or less will bring the umbilical hose 502 into alignment with the longitudinal travel direction of the automated guided vehicle (AGV) when operating within the interior of the fuselage F. This operation of the swing arm 518 thus prevents kinking of the umbilical hose 502 as it changes direction substantially 90° within the interior of the fuselage F.

Accompanying FIG. 21 depicts an automated flow diagram for applying a treatment fluid to the interior surfaces of an aircraft fuselage F using the systems and assemblies described previously. As shown, the process begins with step 700 by positioning the aircraft fuselage F within the application booth AB (see FIG. 1). The fuselage F is aligned relative to a series of positioning lasers (not shown) so as to correctly align the fuselage F within the application booth AB along predetermined X (lateral) and Y (longitudinal) baseline axes.

Once the fuselage F is properly positioned within the application booth AB, the robotic assembly 300 carried by the automated guided vehicle (AGV) is prepared according to step 702 for entry into the interior of the fuselage F and application of the fluid onto the interior surfaces thereof. Such preparation may include, for example, ensuring that the fluid pots are filled with sufficient amount of fluid for application and that all supply and waste lines are properly connected to the robotic assembly 300 via the umbilical hose 502. A camera vision system (not shown) cooperating with datum points on the movable support carrier for the fuselage F may then be accessed and operated in step 704 to determine whether or not the fuselage is properly positioned within the application booth AB relative to the automated guided vehicle (AGV) in its standby position on platform P1. If the fuselage F is determined in the decision block 706 to be misaligned relative to the X and Y baseline axes, then the location of the fuselage may be incrementally changed by physically moving the fuselage F when practicing step 708 until such time that the fuselage F is determined by step 706 to be properly aligned within the application booth AB.

Once the fuselage F is determined to be properly aligned with the application booth AB, the platform P1 on which the AGV is supported in an initial stand-by position on the exterior of the fuselage F (see FIG. 2A) may be adjusted in step 710 by selectively operating the jack screw units 22 to thereby responsively move the jack screw supports 20. Once the fuselage F is properly aligned with the platform P1 and the automated guided vehicle (AGV) thereon, the operator will then prepare the fuselage in step 712 by assembling the rail systems 100, 110 to allow the transfer of the automated guided vehicle (AGV) from the platform P1 and into the interior of the fuselage F per step 714. At this time, the sealing door assembly 400 may also be positioned so as to seal the interior of the fuselage F so that the robotic assembly 300 on the automated guided vehicle (AGV) may thereafter be operated in step 716 to conduct spraying of the fluid onto the interior fuselage surfaces. When the spraying process is completed, the automated guided vehicle (AGV) may be recovered in step 718 by reversing the deployment procedures described previously.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method to apply a treatment fluid onto surfaces on an interior of an aircraft fuselage, wherein the method comprises:
    (a) deploying an automated guided vehicle (AGV) comprising a carriage assembly and a robotic spray system carried by the carriage assembly through a cabin door opening of the fuselage so as to position the AGV within the interior of the fuselage;
    (b) closing the cabin door opening with a sealing door assembly so as to seal the interior of the fuselage with the AGV positioned therewithin; and
    (c) operating the AGV so as to move within the interior of the fuselage along a longitudinal axis thereof to spray the treatment fluid onto the surfaces thereof.

2. The method as in claim 1, wherein step (a) comprises the steps of:
    (a1) providing a support platform which supports an automated guided vehicle (AGV)
    (a2) positioning the aircraft fuselage within an application booth adjacent to the support platform so that the cabin door opening of the fuselage is aligned with the AGV on the support platform; and
    (a3) operating the carriage assembly so as to move the AGV from the support platform through the cabin door opening and into the interior of the fuselage.

3. The method as in claim 2, wherein step (a3) comprises moving the AGV in a deployment direction transverse to the longitudinal axis of the fuselage from the support platform, through the cabin door opening and into the interior of the fuselage, and thereafter moving the AGV in a longitudinal direction along the longitudinal axis thereof.

4. The method as in claim 3, wherein the carriage assembly of the AGV comprises deployment guide wheel assemblies and carriage drive assemblies, and wherein step (a3) comprises operating the carriage assembly so that the deployment guide wheel assemblies thereof are engaged with a lateral rail system while the carriage drive assemblies are spaced thereabove to allow movement of the AGV in the deployment direction.

5. The method as in claim 4, wherein step (a3) comprises raising the deployment guide wheel assemblies when the AGV is positioned in the interior of the fuselage so as to lower the carriage drive assemblies into contact with an interior rail system aligned along the longitudinal axis of the fuselage while the deployment guide wheel assemblies are spaced thereabove.

6. The method as in claim 1, wherein step (b) is practiced by moving the sealing door assembly behind the AGV to close the door opening with the AGV positioned within the interior of the fuselage.

7. The method as in claim 6, wherein the sealing door assembly comprises a dummy door which is sized and configured to close the door opening of the fuselage, and wherein step (b) further comprises positioning the dummy door within the door opening of the fuselage when the AGV is positioned within the interior of the fuselage.

8. The method according to claim 7, which further comprises inflating an inflatable seal around a perimeter of the sealing door assembly so as to seal the interior of the fuselage.

9. The method as in claim 7, wherein the sealing door assembly is slideably moveable along door rails in the deployment direction reciprocally towards and away from the door opening in the fuselage.

10. The method as in claim 1, wherein step (c) comprises periodically stopping movement of the AGV within the interior of the fuselage along the longitudinal axis thereof so as to allow the robotic assembly to spray the treatment fluid onto selected adjacent interior fuselage surfaces.

11. The method as in claim 10, which comprises operating a clamping assembly to lower clamp pads into clamping contact with the interior rails to thereby positionally clamp the AGV thereto.

12. The method as in claim 1, wherein step (a) comprises connecting an umbilical hose to the AGV so as to supply external fluid, electrical and/or compressed air services to the AGV.

\* \* \* \* \*